United States Patent
Mok et al.

(10) Patent No.: US 10,348,378 B2
(45) Date of Patent: Jul. 9, 2019

(54) ELECTRONIC DEVICE AND METHOD FOR CONTROLLING BEAM

(71) Applicant: Samsung Electronics Co., Ltd., Gyeonggi-do (KR)

(72) Inventors: Youngjoong Mok, Suwon-si (KR); Youngbin Chang, Anyang-si (KR); Sangkyu Baek, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/687,349

(22) Filed: Aug. 25, 2017

(65) Prior Publication Data

US 2018/0062717 A1 Mar. 1, 2018

(30) Foreign Application Priority Data

Aug. 26, 2016 (KR) .................. 10-2016-0109008

(51) Int. Cl.
*H04B 7/0408* (2017.01)
*H04B 7/06* (2006.01)
*H04W 68/02* (2009.01)
*H04B 7/08* (2006.01)
*H04B 7/0404* (2017.01)

(52) U.S. Cl.
CPC .......... *H04B 7/061* (2013.01); *H04B 7/0408* (2013.01); *H04B 7/086* (2013.01); *H04B 7/088* (2013.01); *H04W 68/02* (2013.01); *H04B 7/0404* (2013.01)

(58) Field of Classification Search
CPC ...... H04B 7/06; H04B 7/0617; H04B 7/0408; H04W 68/02
See application file for complete search history.

(56) References Cited

U.S. PATENT DOCUMENTS

| | | | |
|---|---|---|---|
| 6,868,156 B1 * | 3/2005 | Narayan | .............. H04Q 1/30 379/379 |
| 9,318,794 B2 | 4/2016 | Chang et al. | |
| 9,515,372 B2 | 12/2016 | Chang et al. | |

(Continued)

OTHER PUBLICATIONS

Tsang et al. "Detecting Human Blockage and Device Movement in mmWave Communication System"; Global Telecommunications Conference (Globecom 2011); IEEE; 2011; 6 pages.

*Primary Examiner* — Kamran Afshar
*Assistant Examiner* — Farideh Madani

(57) ABSTRACT

The present disclosure relates to a 5G generation or pre-5G communication system for supporting a higher data transmission rate than a 4G communication system such as LTE. A method of an electronic device according to various embodiments of the present disclosure includes: receiving a first signal transmitted from another electronic device in a first state through a first beam; in response to the electronic device entering a designated mode, activating a sensor for detecting a change in a state of the electronic device; in response to a detection that the state of the electronic device changes from the first state to a second state using the activated sensor, determining at least one value for indicating the second state; changing a beam for receiving a signal from the first beam to a second beam based on the determined at least one value; and receiving a second signal transmitted from the another electronic device through the second beam.

20 Claims, 17 Drawing Sheets

(56) References Cited

U.S. PATENT DOCUMENTS

| | | | |
|---|---|---|---|
| 2013/0040682 A1* | 2/2013 | Chang | H01Q 1/243 |
| | | | 342/368 |
| 2013/0324157 A1* | 12/2013 | Park | H04W 60/00 |
| | | | 455/456.1 |
| 2017/0155439 A1 | 6/2017 | Chang et al. | |
| 2017/0290086 A1* | 10/2017 | Patel | H04W 8/183 |
| 2017/0325057 A1* | 11/2017 | Zhang | H04W 4/02 |
| 2018/0020182 A1* | 1/2018 | Takagaki | G06F 3/16 |

\* cited by examiner

ELECTRONIC DEVICE AND METHOD FOR CONTROLLING BEAM

CROSS-REFERENCE TO RELATED APPLICATION AND CLAIM OF PRIORITY

This application is related to and claims priority to Korean Patent Application No. 10-2016-0109008 filed on Aug. 26, 2016, the contents of which are incorporated herein by reference.

TECHNICAL FIELD

The present disclosure relates generally to an electronic device, and more particularly, to an electronic device for controlling a beam and a method thereof.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

It is common that an electronic device updates a best (or preferred) beam for receiving a signal based on a training signal which is received from another electronic device in every designated period.

Therefore, when there is a change in the state of the electronic device in a section between a time at which the electronic device determines a best beam based on a currently received training signal and a time at which the electronic device receives a next training signal, the electronic device has no choice but to receive a signal from another electronic device through a beam without considering the change in the state of the electronic device. In other words, the electronic device has no choice but to receive a signal from another electronic device through a beam which is not appropriate to the current state of the electronic device.

SUMMARY

To address the above-discussed deficiencies, it is a primary object to provide at least the advantages described below. Accordingly, the present disclosure provides an electronic device which controls a beam in response to a state of the electronic device being changed, and a method thereof.

According to an aspect of the present disclosure, there is provided an electronic device in a wireless environment, including: at least one processor; a sensor functionally connected with the at least one processor and configured to detect a change in a state of the electronic device; and a communication interface functionally connected with the at least one processor, the at least one processor configured to: control to receive a first signal transmitted from another electronic device in a first state through a first beam; in response to the electronic device entering a designated mode, activate the sensor; in response to it being detected that the state of the electronic device changes from the first state to a second state using the activated sensor, determine at least one value for indicating the second state; change a beam for receiving a signal from the first beam to a second beam based on the determined at least one value; and control to receive a second signal transmitted from the another electronic device through the second beam.

According to another aspect of the present disclosure, there is provided a method of an electronic device in a wireless environment, the method including: receiving a first signal transmitted from another electronic device in a first state through a first beam; in response to the electronic device entering a designated mode, activating a sensor for detecting a change in a state of the electronic device; in response to it being detected that the state of the electronic device changes from the first state to a second state using the activated sensor, determining at least one value for indicating the second state; changing a beam for receiving a signal from the first beam to a second beam based on the determined at least one value; and receiving a second signal transmitted from the another electronic device through the second beam.

An electronic device and a method thereof according to various embodiments of the present disclosure can communicate with another electronic device through a beam corresponding to a current state of the electronic device by controlling the beam in response to the state of the electronic device being changed.

Effects achieved in the present disclosure are not limited to the above-mentioned effects, and other effects not mentioned herein could be clearly understood by an ordinary skilled person in the related art based on the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
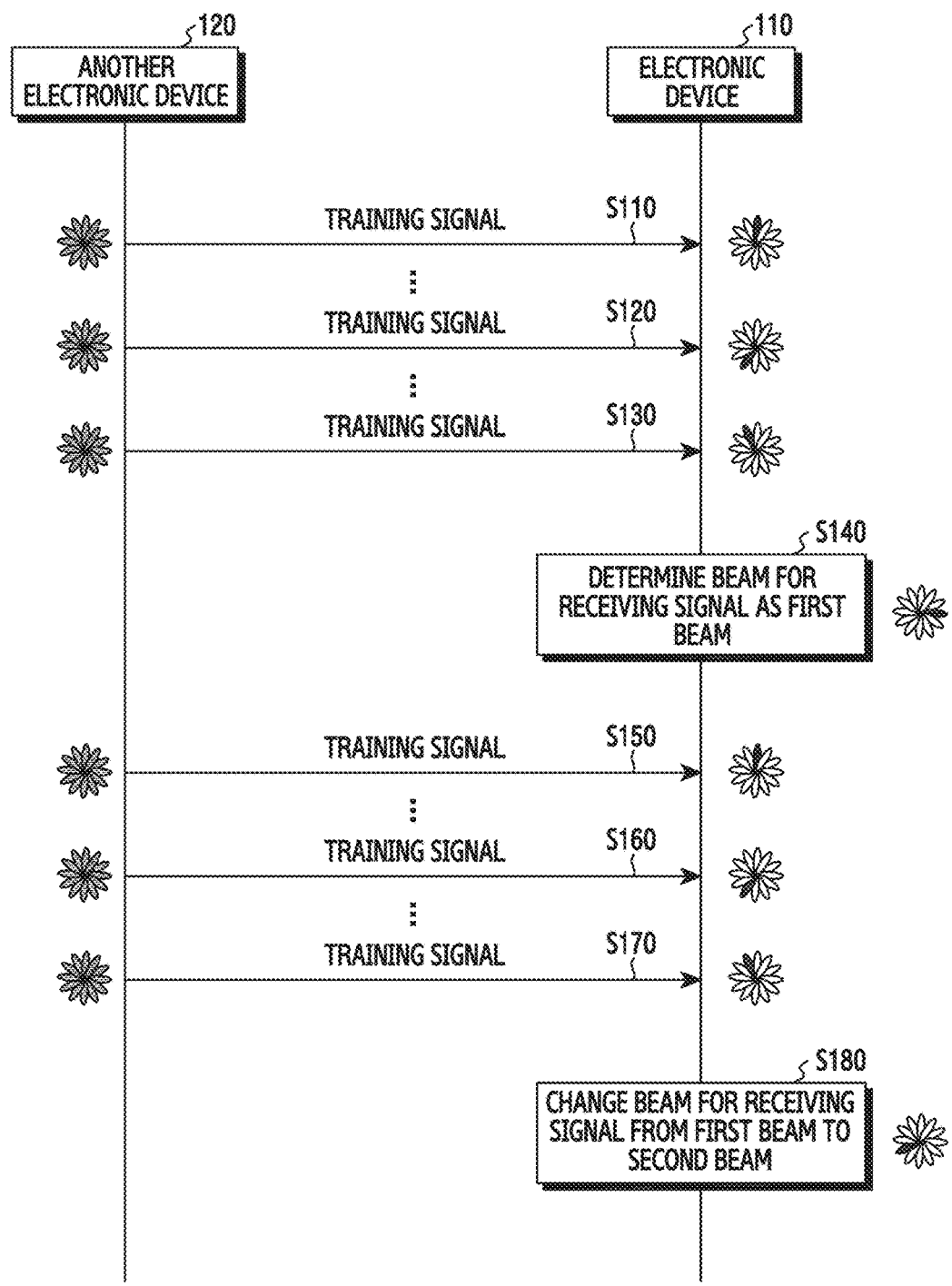
FIG. 1 illustrates an example of a signal flow between an electronic device which changes a beam and another electronic device.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In various embodiments of the present disclosure which will be described hereinbelow, hardware level approach methods will be described by way of an example. However, since various embodiments of the present disclosure include technology using hardware and software, various embodiments of the present disclosure do not exclude software-based approach methods.

To obtain a high data transmission rate, communication methods for transmitting and receiving signals through a superhigh frequency band (mmWave) which is capable of using a wider bandwidth are being considered. A signal transmitted and received using the superhigh frequency band has problems that it has a relatively short transmission and reception distance due to its strong straightness and has a relatively great path loss. To solve these problems, technology of transmitting and receiving signals through beams is developing.

A transmit end for transmitting a signal through a beam and a receive end for receiving a signal through a beam may perform a procedure for selecting a beam to use beams efficiently. The procedure may be referred to as a beam signaling procedure, a beam training procedure, a beam sweeping procedure, a beam selecting procedure, or the like. For example, the procedure may include: a process of transmitting, by the transmit end, a plurality of training signals through a plurality of beams of the transmit end; a process of receiving, by the receive end, the plurality of training signals through a plurality of beams of the receive end; a process of selecting, by the receive end, at least one beam that is appropriate for communication with the transmit end from among the plurality of beams of the transmit end based on the received plurality of training signals;

and/or a process of selecting, by the receive end, at least one beam that is appropriate for communication with the transmit end from among the plurality of beams of the receive end based on the received plurality of training signals.

Since the procedure uses signaling between the transmit end and the receive end as described above, the procedure may be performed in every predefined period during a designated time interval. Accordingly, when the state of the receive end is changed between a current period and a next period, the receive end cannot receive a signal through an appropriate beam until the next period arrives.

Therefore, the present disclosure suggests a method for receiving a signal efficiently through a beam which is updated according to a state of an electronic device (for example, a receive end or the like).

FIG. 1 illustrates an example of a signal flow between an electronic device which selects a beam and another electronic device.

In FIG. 1, the electronic device 110 may be a device that receives a wireless communication service from another electronic device 120. In some embodiments, the electronic device 110 may be a device that provides a wireless communication service to another electronic device 120.

In some embodiments, the electronic device 110 may be a device that has mobility. For example, the electronic device 110 may be a mobile phone, a smart phone, a music player, a portable game console, a navigation system, a laptop computer, or the like. The electronic device 110 may be referred to as a mobile station, a terminal station (STA), user equipment, or the like.

Another electronic device 120 may be a device that provides a wireless communication service to the electronic device 110. In some embodiments, another electronic device 120 may be a device that receives a wireless communication service from the electronic device 110.

In some embodiments, another electronic device 120 may be a fixed device. For example, another electronic device 120 may be a base station. Another electronic device 120 may be referred to as a base station, an evolved node B (eNB), an access point (AP), or the like.

Referring to FIG. 1, in step S110, another electronic device 120 may transmit a plurality of training signals to the electronic device 110 through a plurality of beams of another electronic device 120. The training signal may be a signal for determining a beam of another electronic device 120 that is appropriate for communication with the electronic device 110 from among the plurality of beams of another electronic device 120. The training signal may be a signal for determining a beam of the electronic device 110 that is appropriate for communication with another electronic device 120 from among the plurality of beams of the electronic device 110. According to embodiments, the training signal may be referred to as a reference signal, a beam reference signal (BRS), or the like.

The electronic device 110 may receive, from another electronic device 120, the plurality of training signals transmitted through the plurality of beams of another electronic device 120 through one beam from among the plurality of beams (for example, a first beam to an n-th beam) of the electronic device 110.

In step S120, another electronic device 120 may transmit a plurality of training signals to the electronic device 110 through the plurality of beams of another electronic device 120. The electronic device 110 may receive, from another electronic device 120, the plurality of training signals transmitted through the plurality of beams of another electronic device 120 through another beam from among the plurality of beams of the electronic device 110.

In step S130, another electronic device 120 may transmit a plurality of training signals to the electronic device 110 through the plurality of beams of another electronic device 120. The electronic device 110 may receive, from another electronic device 120, the plurality of training signals transmitted through the plurality of beams of another electronic device 120 through still another beam from among the plurality of beams of the electronic device 110.

In step S140, the electronic device 110 may determine a beam for receiving a signal from another electronic device 120 from among the plurality of beams of the electronic device 110 as a first beam. For example, the electronic device 110 may determine a path loss value or a gain value between the electronic device 110 and another electronic device 120 according to each of the plurality of beams of the electronic device 110 based on information on transmission power of another electronic device 120, which is included in the training signal. The electronic device 110 may determine, as the first beam for receiving a signal from another electronic device 120, a beam that has a lowest path loss value from among the plurality of beams of the electronic device 110. Although a process of selecting one beam of the electronic device 110 is illustrated in FIG. 1, this is merely an example. According to embodiments, the electronic device 110 may determine a plurality of beams that have path loss values lower than a threshold (or gain values higher than a threshold) as a beam for receiving a signal from another electronic device 120.

In step S150, another electronic device 120 may transmit a plurality of training signals to the electronic device 110 through the plurality of beams of another electronic device 120 in order to consider that a state of a path between the electronic device 110 and another electronic device 120 is changed. The electronic device 110 may receive, from another electronic device 120, the plurality of training signals transmitted through the plurality of beams of another electronic device 120 through one beam from among the plurality of beams of the electronic device 110.

In step S160, another electronic device 120 may transmit a plurality of training signals to the electronic device 110 through the plurality of beams of another electronic device 120 in order to consider that the state of the path between the electronic device 110 and another electronic device 120 is changed. The electronic device 110 may receive, from another electronic device 120, the plurality of training signals transmitted through the plurality of beams of another electronic device 120 through another beam from among the plurality of beams of the electronic device 110.

In step S170, another electronic device 120 may transmit a plurality of training signals to the electronic device 110 through the plurality of beams of another electronic device 120 in order to consider that the state of the path between the electronic device 110 and another electronic device 120 is changed. The electronic device 110 may receive, from another electronic device 120, the plurality of training signals transmitted through the plurality of beams of another electronic device 120 through still another beam from among the plurality of beams of the electronic device 110.

In step S180, the electronic device 110 may change the beam for receiving a signal from another electronic device 120 from the first beam determined in step S140 to a second beam. For example, when the state of the path between the electronic device 110 and another electronic device 120 is changed, a beam that has a lowest path loss value from among the plurality of beams of the electronic device 110 may not be the first beam but the second beam. The electronic device 110 may change the beam for receiving a signal from another electronic device 120 from the first beam to the second beam based on the change in the state of the path between the electronic device 110 and another electronic device 120.

According to exemplary embodiments, each of the operations in steps S110 to S140 and the operation in steps S150 to S180 may be referred to as beam signaling, beam measurement, beam training, or the like.

As described above, the electronic device 110 may identify (or determine) the beam for receiving a signal from another electronic device 120 from among the plurality of beams of the electronic device 110 through the beam signaling operation. However, when the state of the electronic device 110 is changed in a time section between beam signaling in a previous period and beam signaling in a next period, the electronic device 110 cannot receive a signal transmitted from another electronic device 120 through the best (preferred) beam until the next beam signaling is completed.

Therefore, various embodiments of the present disclosure suggest an operation of adaptively changing a beam for receiving a signal according to a change in the state of an electronic device without the beam signaling. In some embodiments, the operation of adaptively changing the beam for receiving a signal may be referred to as a beam locking operation.

Figure 2:
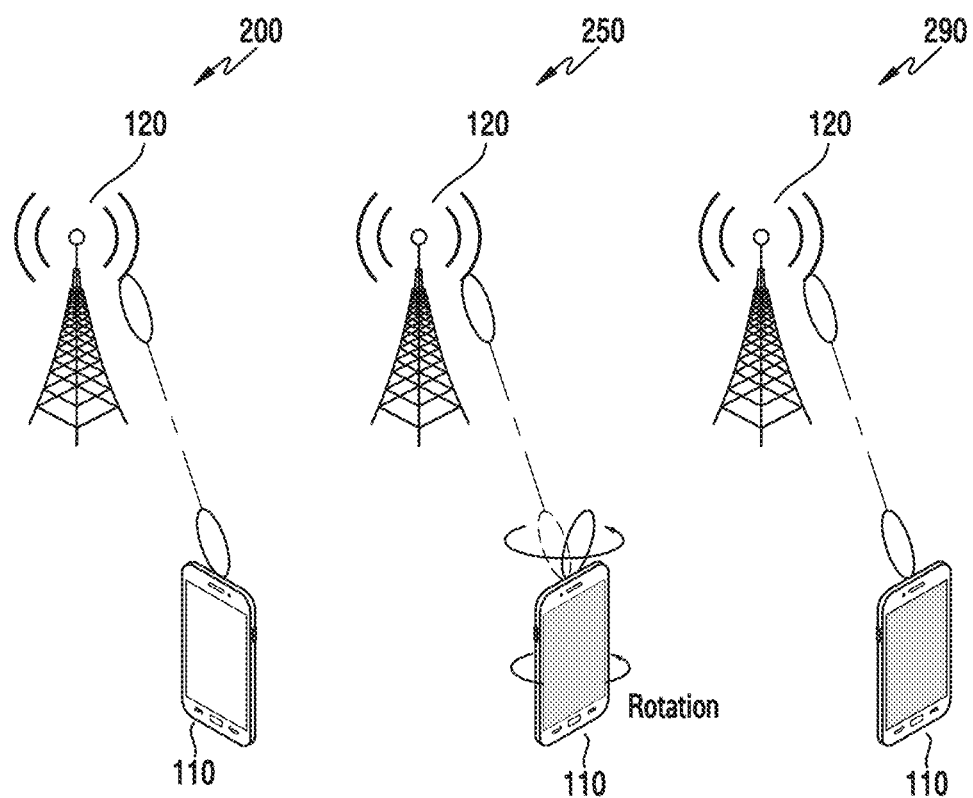
FIG. 2 illustrates an example of an operation of an electronic device which changes a beam through beam signaling.

FIG. 2 illustrates an example of an operation of an electronic device which changes a beam through beam signaling.

Referring to FIG. 2, in a wireless environment 200, another electronic device 120 may transmit a signal to the electronic device 110 through a beam or one or more beams from among a plurality of beams of another electronic device 120. The beam may be a beam that is determined (or identified) from among the plurality of beams of another electronic device 120 according to beam signaling as illustrated in FIG. 1.

The electronic device 110 may receive the signal transmitted from another electronic device 120 through a beam or one or more beams from among a plurality of beams of the electronic device 110. The beam may be a beam that is determined (or identified) from among the plurality of beams of the electronic device 110 according to beam signaling as illustrated in FIG. 1.

In a wireless environment 250, the electronic device 110 may have a different state from that of the electronic device 110 in the wireless environment 200. For example, when the user of the electronic device 110 plays an internet racing game, the electronic device 110 may be rotated by control of the user. In other words, the direction of the electronic device 110 in the wireless environment 200 and the direction of the electronic device 110 in the wireless environment 250 may be different from each other.

In the wireless environment 250, the electronic device 110 may operate without performing beam signaling for changing a beam according to a changed direction. In other words, the electronic device 110 in the wireless environment 250 may operate without determining a best beam according to the changed direction. Since the electronic device 110 has no choice but to receive the signal transmitted from another electronic device 120 through a beam which is determined through a previous beam signaling procedure, the signal transmitted from another electronic device 120 may have a relatively low transmission rate.

In a wireless environment 290, the electronic device 110 may determine a beam considering the changed state of the electronic device 110 through beam signaling with another electronic device 120. The electronic device 110 may receive the signal transmitted from another electronic device 120 through the determined beam.

As described above, when the state of the electronic device 110 is changed in a section between a previous beam signaling time and a next beam signaling time, the electronic device 110 may not receive the signal transmitted from another electronic device 120 through a best beam corresponding to the changed state.

Therefore, an electronic device which adaptively changes a beam according to a state of the electronic device regardless of a beam signaling time, and an operation method thereof is used.

Figure 3:
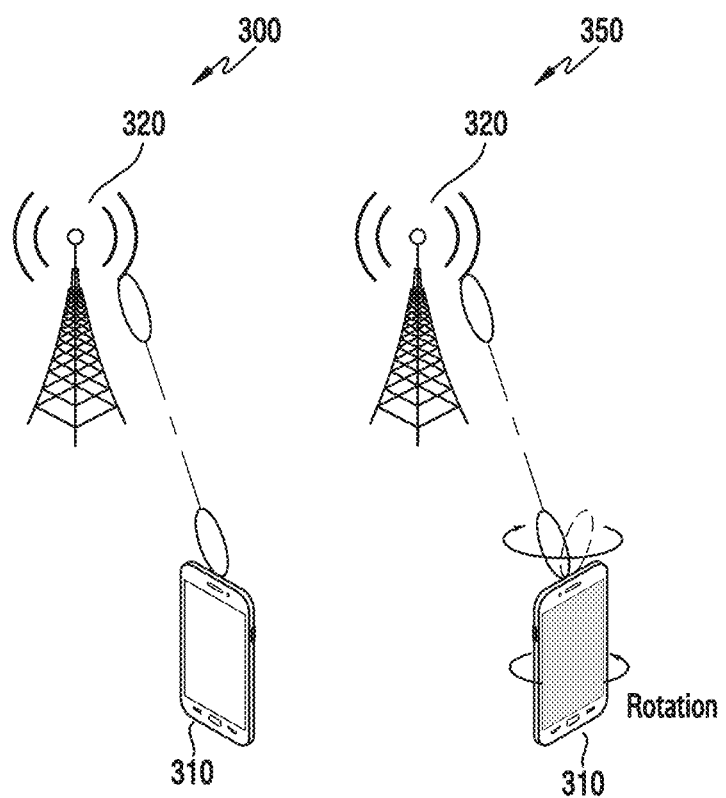
FIG. 3 illustrates an example of an operation of an electronic device which changes a beam according to various embodiments of the present disclosure.

FIG. 3 illustrates an example of an operation of an electronic device which changes a beam according to various embodiments of the present disclosure.

In FIG. 3, the electronic device 310 may be a device that receives a wireless communication service from another electronic device 320. In some embodiments, the electronic device 310 may be a device that provides a wireless communication service to another electronic device 320.

In some embodiments, the electronic device 310 may be a device that has mobility. For example, the electronic device 310 may be a mobile phone, a smart phone, a music player, a portable game console, a navigation system, a laptop computer, or the like. The electronic device 310 may be referred to as a mobile station, a terminal station (STA), user equipment, or the like.

Another electronic device 320 may be a device that provides a wireless communication service to the electronic device 310. In some embodiments, another electronic device 320 may be a device that receives a wireless communication service from the electronic device 310.

In some embodiments, another electronic device 320 may be a fixed device. For example, another electronic device 320 may be a base station. Another electronic device 320 may be referred to as a base station, an evolved node B (eNB), an access point (AP), or the like.

Referring to FIG. 3, in a wireless environment 300, the electronic device 310 may receive a signal from another electronic device 320 through a first beam of the electronic device 310. In the wireless environment 300, the beam of the electronic device 310 may be determined based on beam signaling between the electronic device 310 and another electronic device 320. In the wireless environment 300, the beam of the electronic device 310 may be a best beam for receiving the signal transmitted from another electronic device 320.

In a wireless environment 350, the electronic device 310 may change its state. For example, the electronic device 310 may be rotated. The electronic device 310 may detect the changed state through a sensor in the electronic device 310. In addition, the electronic device 310 may determine a value for indicating the changed state. For example, the electronic device 310 may detect that the electronic device 310 has been rotated through a gyro sensor in the electronic device 310. In addition, the electronic device 310 may determine a rotation variation of the electronic device 310. The rotation variation may refer to a difference value between a previous state of the electronic device 310 and a current state of the electronic device 310. The rotation variation may be a value for indicating the current state of the electronic device 310. In another example, the electronic device 310 may detect that the electronic device 310 has moved using an accelerometer in the electronic device 310. In response to it being detected that the electronic device 310 has moved, the electronic device 310 may determine a movement variation of the electronic device 310.

The electronic device 310 may change the beam of the electronic device 310 based on the value for indicating the changed state (for example, the rotation variation or the like). For example, the electronic device 310 may change the beam for receiving the signal from another electronic device 320 from the first beam to a second beam. Since the second beam is determined based on the changed state of the electronic device 310, the electronic device 310 may receive the signal transmitted from another electronic device 320 at a high transmission rate.

As described above, the electronic device 310 may determine the beam corresponding to the state of the electronic device 310 using the sensor in the electronic device 310 without beam signaling between the electronic device 310 and another electronic device 320. Since the electronic device 310 can adaptively change the beam according to the state of the electronic device 310, the electronic device 310 can efficiently receive the signal transmitted from another electronic device 320.

Figure 4:
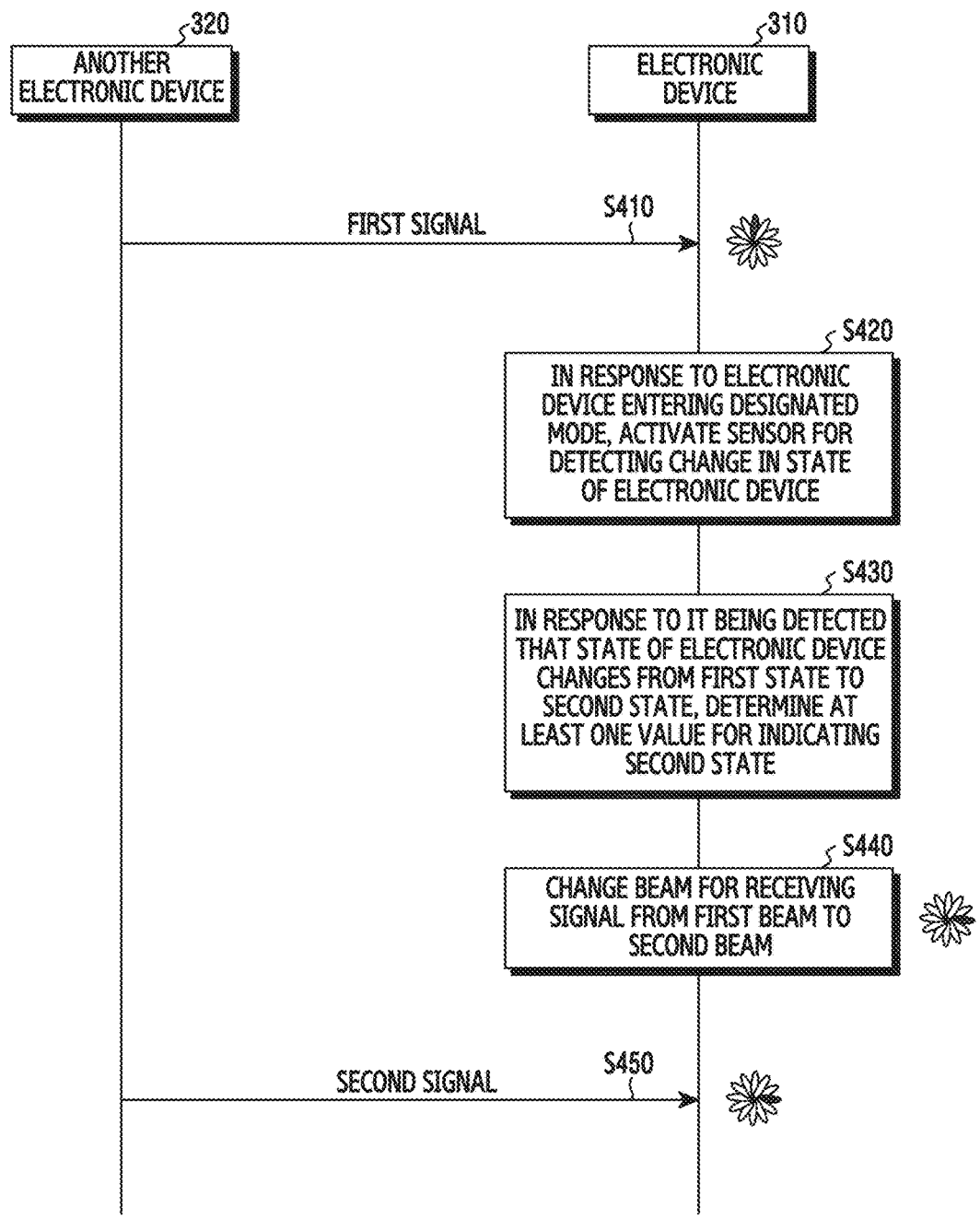
FIG. 4 illustrates an example of a signal flow between an electronic device which changes a beam and another electronic device according to various embodiments of the present disclosure.

FIG. 4 illustrates an example of a signal flow between an electronic device which changes a beam and another electronic device according to various embodiments of the present disclosure.

Referring to FIG. 4, in step S410, another electronic device 320 may transmit a first signal to the electronic device 310. The electronic device 310 may receive the first signal transmitted from another electronic device 320 in a first state through a first beam. The first beam may be a beam that is determined through beam signaling between the electronic device 310 and another electronic device 320. The first beam may be a beam corresponding to the state of the electronic device 310. The electronic device 310 may be a device that has performed beam signaling with another electronic device 320 in the first state.

In step S420, in response to the electronic device 310 entering a designated mode, the electronic device 310 may activate a sensor for detecting that the state of the electronic device 310 is changed. The designated mode may be configured to initiate (or trigger) activation of the sensor.

In some embodiments, the designated mode may be configured to predict that the electronic device 310 will receive data from another electronic device 320. For example, the designated mode may include a mode in which the electronic device 310 initiates decoding of control information received from another electronic device 320 in a discontinuous reception (DRX) cycle. In another example, the designated mode may include a mode in which the electronic device 310 initiates reception of a paging signal from another electronic device 320.

In some other embodiments, the designated mode may be configured to predict that the state of the electronic device 310 will be changed. For example, the designated mode may include a mode in which the electronic device 310 initiates execution of an application which may cause the state of the electronic device 310 to be changed.

In some other embodiments, the designated mode may be configured to maintain a transmission rate of data. For example, when it is determined that a reception intensity of a signal received from another electronic device 320 is lower than a reference intensity or a data transmission and reception error of the electronic device 310 is higher than a threshold, the electronic device 310 may enter the designated mode to prevent a reception rate of the signal received from another electronic device 320 from becoming lower than a threshold.

In some other embodiments, the designated mode may be configured to reduce power consumption of the electronic device 310.

In step S430, in response to it being detected that the state of the electronic device 310 changes from the first state to a second state, the electronic device 310 may determine at least one value for indicating the second state. The at least one value may be a value for assisting in determining a beam corresponding to the second state. The at least one value may be differently set according to a type of a sensor in the electronic device 310. For example, when it is detected that the electronic device 310 is rotated through the gyro sensor in the electronic device 310, the electronic device 310 may determine a rotation variation of the electronic device 310 as at least one value for indicating the second state. In this case, the at least one value may include a value indicating an X-axis rotation (for example, roll), a value indicating a Y-axis rotation (for example, yaw), and a value indicating a Z-axis rotation (for example, pitch).

In step S440, the electronic device 310 may change the beam for receiving the signal transmitted from another electronic device 320 from the first beam to a second beam based on the determined at least one value. The second beam may be a beam that corresponds to at least one value from among the plurality of beams of the electronic device 310.

In some embodiments, although not shown in FIG. 4, the electronic device 310 may determine a beam corresponding to the second beam from among the plurality of beams for transmitting a signal as a beam for transmitting a signal to another electronic device 320.

In step S450, another electronic device 320 may transmit a second signal to the electronic device 310. The electronic device 310 may receive the second signal transmitted from another electronic device 320 in the second state through the changed second beam. Since the second beam is a beam corresponding to at least one value for indicating the second state, a transmission rate of the second signal may have a relatively high value.

As described above, through the operations in steps S410 to S450, the electronic device 310 may determine the beam for receiving the signal transmitted from another electronic device 320 without beam signaling with another electronic device 320. Accordingly, the electronic device 310 may maintain a transmission rate higher than or equal to a reference value regardless of the beam signaling period. In addition, since the electronic device 310 activates the sensor in the electronic device 310 when entering the designated mode, the electronic device 310 can reduce power consumed by the sensor.

Figure 5A:
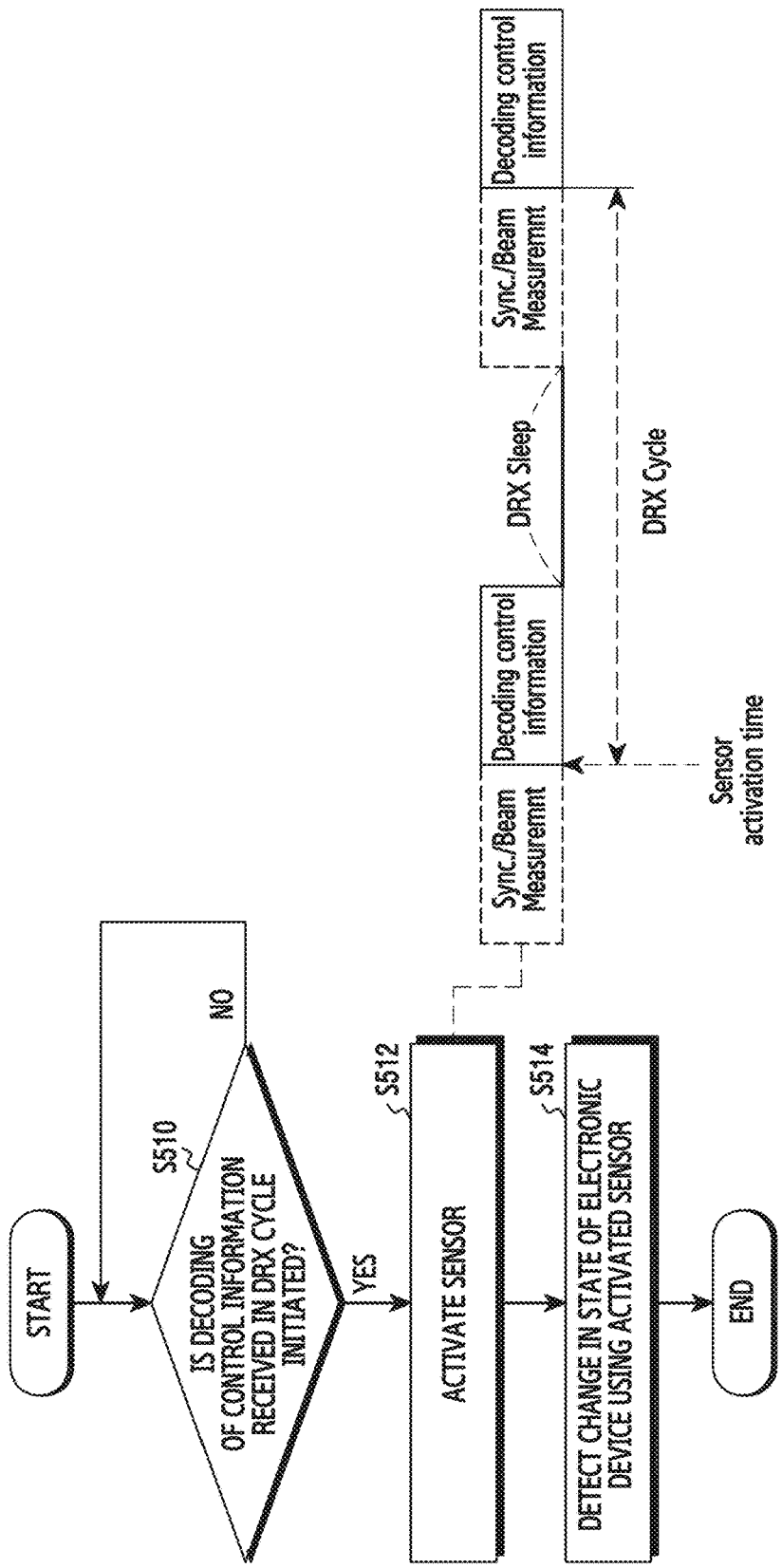
FIG. 5A illustrates an example of an operation flow of an electronic device which activates a sensor according to various embodiments of the present disclosure.

FIG. 5A illustrates an example of an operation flow of an electronic device which activates a sensor according to various embodiments of the present disclosure.

Referring to FIG. 5A, in step S510, the electronic device 310 may determine whether to initiate decoding of control information received in a DRX cycle. The DRX cycle may be a cycle that is set to reduce power consumption of the electronic device 310. The DRX cycle may include a sleep section and a wake-up section. The wake-up section may be a section in which the electronic device 310 determines (or listens) whether there is data to be received from a network (or another electronic device 320). The electronic device 310 which operates in the DRX cycle may determine a beam appropriate to reception of a signal through synchronization/beam signaling (or synchronization/beam measurement) for the wake-up section of the DRX cycle, and may decode control information received from an entity like another electronic device 320. For example, the control information may be a physical downlink control channel (PDCCH). The electronic device 310 may determine whether the entity like another electronic device 320 will transmit data to the electronic device 310 based on the decoded control information.

The operation in step S510 may be an operation for reducing power consumed by the sensor in the electronic device 310.

When the electronic device 310 initiates decoding of the control information received in the DRX cycle, the electronic device 310 may perform an operation in step S512. When the electronic device 310 does not initiate decoding of the control information received in the DRX cycle, the electronic device 310 may not activate the sensor in the electronic device 310 and may continuously monitor whether to initiate decoding of the control information in the DRX cycle.

When the electronic device 310 initiates decoding of the control information received in the DRX cycle, the electronic device 310 may activate the sensor in the electronic device 310 in step S512. For example, the electronic device 310 may activate the sensor at the time when the synchronization/beam measurement finishes (that is, at the time when the electronic device 310 initiates decoding of the received control information) in the wake-up section of the DRX cycle.

In some embodiments, although not shown in FIG. 5A, the electronic device 310 may activate the sensor at a time when it is recognized that data (or a signal) will be received from another electronic device 320 based on the decoded control information.

In step S514, the electronic device 310 may detect a change in the state of the electronic device 310 using the activated sensor. The electronic device 310 may monitor the state of the electronic device 310 using the activated sensor in order to receive a signal (or data) transmitted from another electronic device 320 through a beam corresponding to the state of the electronic device 310. For example, the electronic device 310 may detect whether the electronic device 310 is rotated in order to determine a best beam for receiving a signal. When a rotation value (for example, an X-axis, Y-axis, or Z-axis rotation variation) is greater than or equal to a predetermined threshold, the electronic device 310 may determine the rotation value as a rotation variation. In addition, when an error occurring when the electronic device 310 transmits data is greater than or equal to a threshold, the electronic device 310 may determine the rotation value as the rotation variation. In another example, the electronic device 310 may detect whether the electronic device 310 is moved in order to determine the best beam for receiving a signal. When a variation in movement is greater than or equal to a predetermined threshold, the electronic device 310 may determine the variation in the movement as a movement variation. In addition, when an error occurring when the electronic device 310 transmits or receives data is greater than or equal to a threshold, the electronic device 310 may determine the variation in the movement as the movement variation.

As described above, the electronic device 310 may predict whether data will be received from another electronic device 320 by decoding the control information in the DRX cycle. In addition, when it is predicted that data will be received from another electronic device 320, the electronic device 310 may detect whether the state of the electronic device 310 is changed in order to determine a beam corresponding to the state of the electronic device 310. In other words, the electronic device 310 may determine the best beam for receiving a signal as a beam corresponding to the state of the electronic device 310, while reducing power consumed by the sensor in the electronic device 310.

Figure 5B:
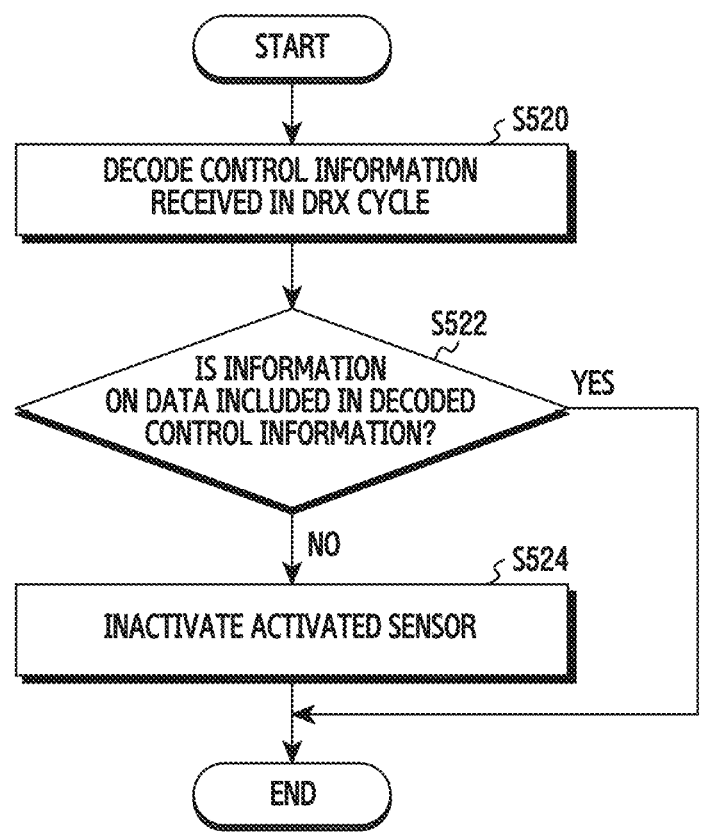
FIG. 5B illustrates an example of an operation flow of an electronic device which inactivates a sensor according to various embodiments of the present disclosure.

FIG. 5B illustrates an example of an operation flow of an electronic device which inactivates a sensor according to various embodiments of the present disclosure.

Referring to FIG. 5B, in step S520, the electronic device 310 may decode control information received in a DRX cycle. The electronic device 310 may decode the control information received in the DRX cycle in order to identify whether data is received from an entity like another electronic device 320.

In step S522, the electronic device 310 may determine whether information on data is included in the decoded control information. The decoded control information may be a downlink control indicator (DCI). For example, the information on the data may include information indicating which resource block (RB) carries the data. In another example, the information on the data may include information indicating what demodulation technique to use to decode the data. The electronic device 310 may recognize, identify, or determine whether data will be received from the entity like another electronic device 320 by determining whether the information on the data is included in the decoded control information.

When the information on the data is included in the decoded control information, the electronic device 310 may maintain the sensor for detecting that the state of the electronic device 310 is changed in the activation state. When the information on the data is not included in the decoded control information, the electronic device 310 may perform an operation in step S524.

In step S524, the electronic device 310 may inactivate the activated sensor. The electronic device 310 may inactivate the activated sensor in order to prevent power from being consumed by the activated sensor. Since the information on the data not being included in the decoded control information means that the electronic device 310 does not receive data from another electronic device 320 during a predefined section, the electronic device 310 does not need to optimize the beam for receiving data transmitted from another electronic device 320. Accordingly, the electronic device 310 may inactivate the sensor activated to determine the best beam.

As described above, through the operations in steps S520 to S524, when the electronic device 310 is not used to perform the operation of determining the beam for receiving data (or a signal), the electronic device 310 may inactivate the activated sensor. In other words, when the electronic device 310 is used to determine the beam for receiving data, the electronic device 310 may detect the state of the electronic device 310 through the activated sensor, and, when the electronic device 310 is not used to determine the beam for receiving data, the electronic device 310 may inactivate the activated sensor, thereby preventing power from being consumed by the activated sensor.

Figure 6A:
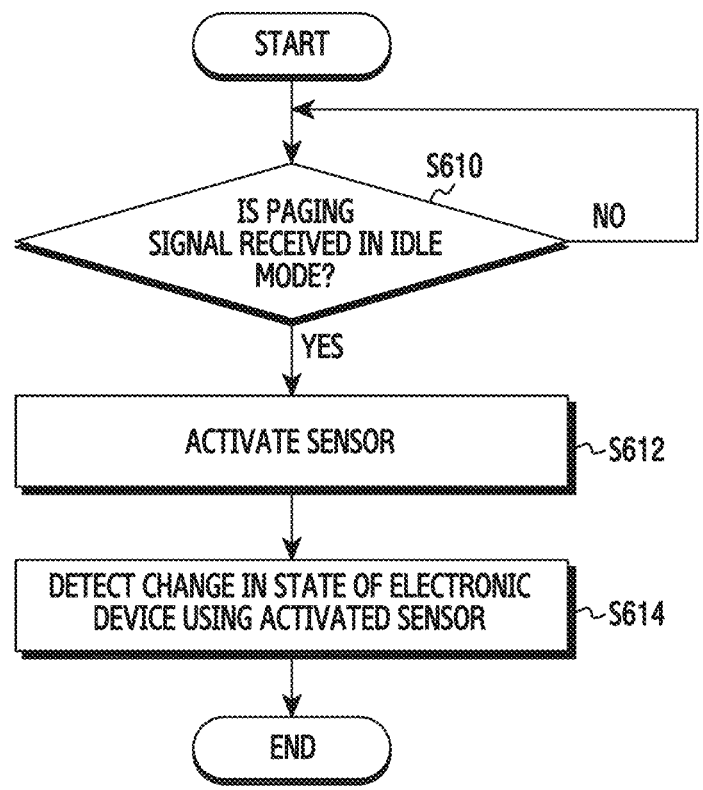
FIG. 6A illustrates another example of an operation flow of an electronic device which activates a sensor according to various embodiments of the present disclosure.

FIG. 6A illustrates another example of an operation flow of an electronic device which activates a sensor according to various embodiments of the present disclosure.

Referring to FIG. 6A, in step S610, the electronic device 310 may determine (or identify) whether a paging signal is received in an idle mode. The idle mode may be a term including a cell search/measurement procedure, a cell selection procedure, and/or a cell reselection procedure. At a specific timing of the idle mode, the electronic device 310 may determine whether a paging signal is received from an entity like another electronic device 320. For example, the specific timing may be a paging occasion (PO). In another example, the specific timing may be a paging frame (PF) which is formed of one or more POs. The electronic device 310 may identify whether the paging signal is received in the idle mode in order to predict whether data (or a signal) will be transmitted from the entity like another electronic device 320.

When the paging signal is received in the idle mode, the electronic device 310 may perform an operation in step S612. When the paging signal is not received in the idle mode, the electronic device 310 may continuously determine whether the paging signal is received.

In step 612, in response to the paging signal being received in the idle mode, the electronic device 310 may activate a sensor for detecting that the state of the electronic device 310 is changed. In response to the paging signal being detected, the electronic device 310 may activate the sensor in order to determine a beam corresponding to the state of the electronic device 310.

In some embodiments, although not illustrated in FIG. 6A, when information (for example, an identifier (ID)) for identifying the electronic device 310 is included in the received paging signal, the electronic device 310 may activate the sensor.

In step S614, the electronic device 310 may detect a change in the state of the electronic device 310 using the activated sensor. The electronic device 310 may monitor the state of the electronic device 310 using the activated sensor in order to receive a signal (or data) transmitted from another electronic device 320 through a beam corresponding to the state of the electronic device 310. For example, the electronic device 310 may detect whether the electronic device 310 is rotated or whether the electronic device 310 is moved in order to determine a best beam for receiving a signal.

As described above, the electronic device 310 may predict whether a signal (or data) will be received from another electronic device 320 by determining whether the paging signal (or message) is received in the idle mode. In addition, when it is predicted that a signal (or data) will be received from another electronic device 320, the electronic device 310 may detect whether the state of the electronic device 310 is changed or not in order to determine a beam corresponding to the state of the electronic device 310. In other words, the electronic device 310 may reduce power consumed by the sensor by adaptively determining whether to activate the sensor in the electronic device 310. In addition, when it is predicted that a signal or data will be received, the electronic device 310 may determine a beam corresponding to the state of the electronic device 310, thereby increasing a transmission rate of the signal or data.

Figure 6B:
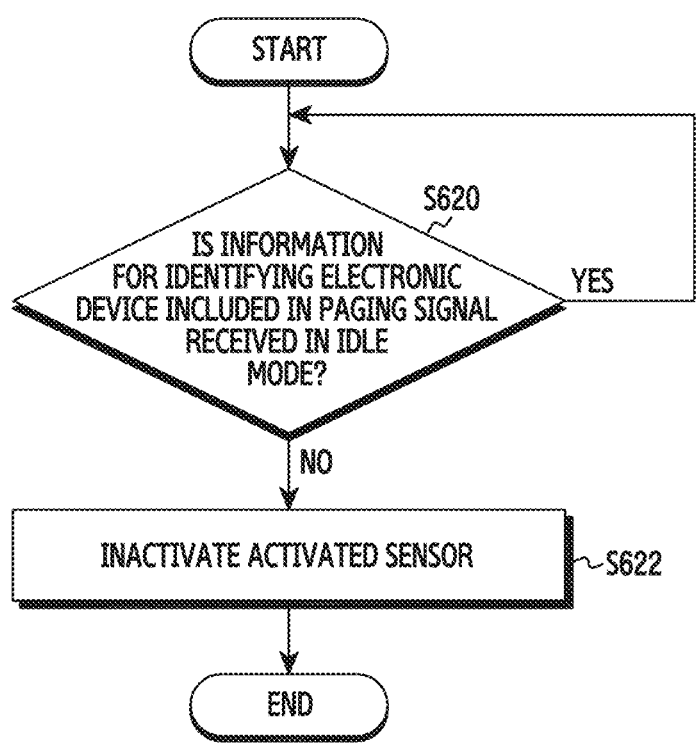
FIG. 6B illustrates another example of an operation flow of an electronic device which inactivates a sensor according to various embodiments of the present disclosure.

FIG. 6B illustrates another example of an operation flow of an electronic device which inactivates a sensor according to various embodiments of the present disclosure.

Referring to FIG. 6B, in step S620, the electronic device 310 may determine whether information for identifying the electronic device 310 is included in the paging signal received in the idle mode. For example, the information for identifying the electronic device 310 may be an ID of the electronic device 310. In addition, the information for identifying the electronic device 310 being included in the received paging signal may indicate that there is data or a signal to be received from an entity like another electronic device 320. The electronic device 310 may determine whether the information for identifying the electronic device 310 is included in the paging signal received in the idle mode in order to identify whether there is data or a signal to be received from the entity like another electronic device 320.

When the information for identifying the electronic device 310 is included in the received paging signal, the electronic device 310 may determine that there is data or a signal to be received from another electronic device 320. Accordingly, the electronic device 310 may maintain the sensor in the activation state in order to receive a signal or data through a beam corresponding to the state of the electronic device 310. When the information for identifying the electronic device 310 is not included in the received paging signal, the electronic device 310 may determine that there is no data or signal to be received from another electronic device 320 during a predefined section. Accordingly, the electronic device 310 may perform an operation in step S622.

In step S622, the electronic device 310 may inactivate the activated sensor. The electronic device 310 may inactivate the activated sensor in order to reduce power consumed by the activated sensor. Since the received paging signal not including the information for identifying the electronic device 310 indicates that the electronic device 310 does not receive a signal or data from another electronic device 320 during the predefined section, the electronic device 310 may not need to optimize the beam for receiving a signal or data transmitted from another electronic device 320. Accordingly, the electronic device 310 may inactivate the sensor which is activated to determine the best beam.

As described above, through the operations in steps S620 and S622, when the electronic device 310 is not used to perform the operation for determining the best beam for receiving data (or a signal), the electronic device 310 may inactivate the activated sensor. In other words, the electronic device 310 may adaptively change the state of the sensor for determining a beam corresponding to the state of the electronic device 310 by predicting whether the electronic device 310 will receive a signal or data.

Figure 7A:
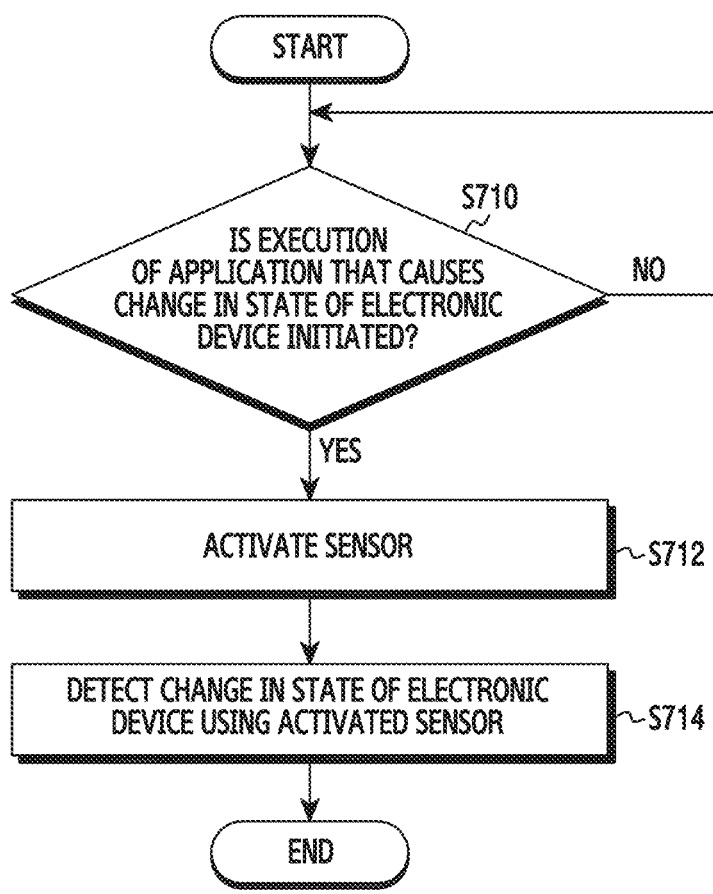
FIG. 7A illustrates still another example of an operation flow of an electronic device which activates a sensor according to various embodiments of the present disclosure.

FIG. 7A illustrates still another example of an operation flow of an electronic device which activates a sensor according to various embodiments of the present disclosure.

Referring to FIG. 7A, in step S710, the electronic device 310 may determine whether to initiate execution of an application which may cause the state of the electronic device 310 to be changed. The application may be an application that is used to receive traffic through a wireless path. The application may be an application that requires the electronic device 310 to be moved or rotated to be controlled. For example, the application that may cause the state of the electronic device 310 to be changed may include an online racing game, a virtual reality (VR)-based movie, or the like. Initiating the application may indicate that it is predicted that the state of the electronic device 310 will be changed. The electronic device 310 may monitor whether to initiate execution of the application in order to receive a signal from another electronic device 320 through a beam corresponding to the changed state of the electronic device 310.

When execution of the application is initiated, the electronic device 310 may perform an operation in step S712. When execution of the application is not initiated, the electronic device 310 may continuously monitor whether the application is executed.

In step S712, in response to execution of the application being initiated, the electronic device 310 may activate the sensor for detecting that the state of the electronic device 310 is changed. The electronic device 310 may activate the sensor to determine a beam corresponding to the state of the electronic device 310.

In step S714, the electronic device 310 may detect a change in the state of the electronic device 310 using the activated sensor. The electronic device 310 may monitor the state of the electronic device 310 using the activated sensor in order to receive a signal (or data) from another electronic device 320 through a beam corresponding to the state of the electronic device 310. For example, the electronic device 310 may detect whether the electronic device 310 is rotated or whether the electronic device 310 is moved.

As described above, the electronic device 310 may predict whether the state of the electronic device 310 will be changed by determining whether execution of the application is initiated. In addition, when it is predicted that the state of the electronic device 310 will be changed, the electronic device 310 may determine a best beam based on the state of the electronic device 310 detected by the activated sensor. In other words, the electronic device 310 may determine whether to activate the sensor in the electronic device 310 based on the application executed in the electronic device 310, such that power consumed by the sensor in the electronic device 310 can be reduced. In addition, the electronic device 310 may determine (or select) a beam to correspond to the state of the electronic device 310 detected by the activated sensor, such that a signal or data can be more efficiently received from another electronic device 320.

Figure 7B:
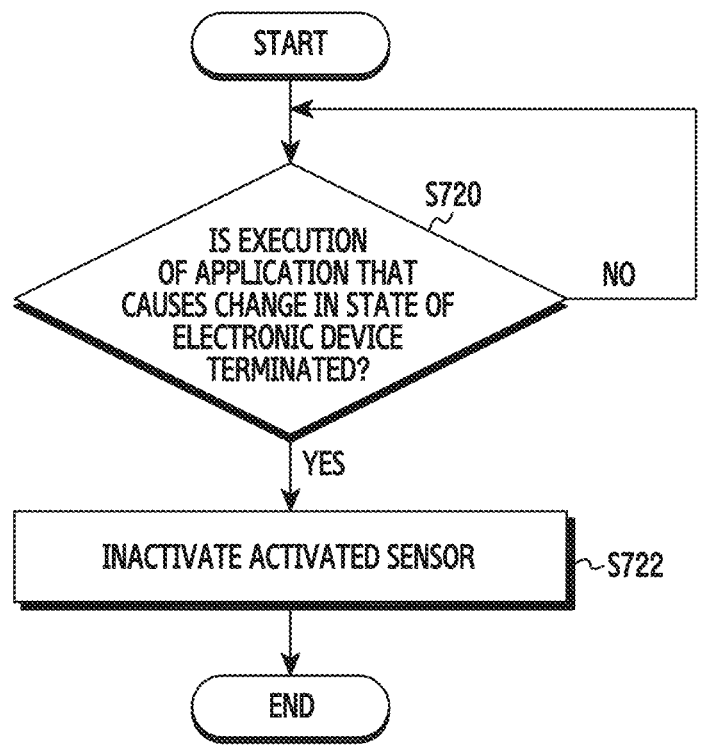
FIG. 7B illustrates still another example of an operation flow of an electronic device which inactivates a sensor according to various embodiments of the present disclosure.

FIG. 7B illustrates still another example of an operation flow of an electronic device which inactivates a sensor according to various embodiments of the present disclosure.

Referring to FIG. 7B, in step S720, the electronic device 310 may determine whether execution of the application which may cause the state of the electronic device 310 to be changed is terminated. For example, when an online racing game being executed in the electronic device 310 is terminated, the electronic device 310 may determine that execution of the application which may cause the state of the electronic device 310 to be changed is terminated. In other words, the electronic device 310 may monitor applications executed in the electronic device 310 in order to determine whether an operation of changing a beam according to the state of the electronic device 310 is continuously requested.

When execution of the application is terminated, the electronic device 310 may perform an operation in step S722. When the application is continuously executed in the electronic device 310, the electronic device 310 may continuously monitor whether the application is terminated or not.

In step S722, the electronic device 310 may inactivate the activated sensor. The electronic device 310 may inactivate the activated sensor in order to reduce power consumed by the activated sensor. Terminating execution of the application may mean that the possibility that the state of the electronic device 310 is changed is relatively reduced. In other words, terminating execution of the application may mean that the electronic device 310 operates without being used to continuously update the beam corresponding to the state of the electronic device 310. Accordingly, the electronic device 310 may inactivate the sensor which is activated to determine a best beam.

As described above, through the operations in steps S720 to S722, when the electronic device 310 is not used to perform the operation for determining the best beam for receiving data (or a signal) the electronic device 310 may inactivate the activated sensor. In other words, the electronic device 310 may adaptively change the state of the sensor for determining a beam corresponding to the state of the electronic device 310 by predicting whether the state of the electronic device 310 will be changed according to the state of the application.

Figure 8:
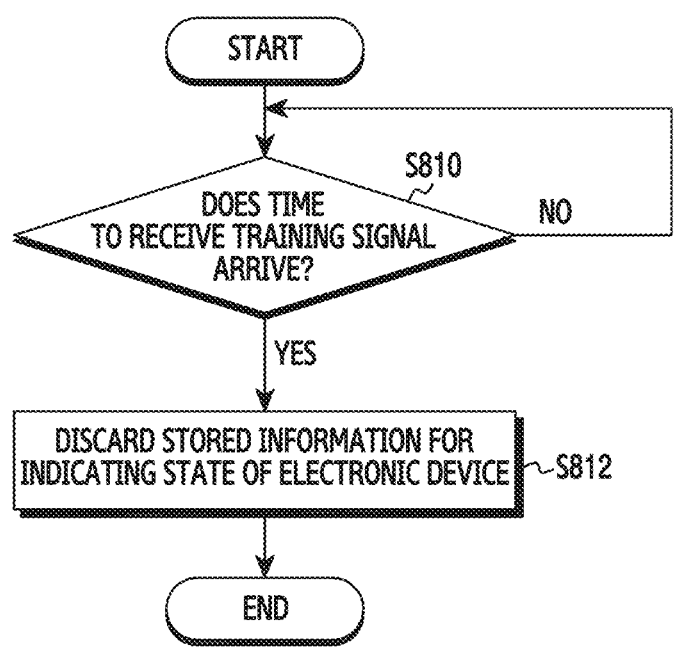
FIG. 8 illustrates an example of an operation flow of an electronic device which discards information for indicating a state of the electronic device according to various embodiments of the present disclosure.

FIG. 8 illustrates an example of an operation flow of an electronic device which discards information for indicating a state of the electronic device according to various embodiments of the present disclosure.

Referring to FIG. 8, in step S810, the electronic device 310 may determine whether a time to receive a training signal arrives or not. For example, the electronic device 310 may operate with information for indicating the state of the electronic device 310, i.e., at least one value for indicating the state of the electronic device 310, being stored in order to determine a beam corresponding to the state of the electronic device 310. When the electronic device 310 performs new beam signaling with another electronic device 320, the electronic device 310 may not need to store the information since the electronic device 310 can determine a beam corresponding to the state of the electronic device 310 through the new beam signaling. Therefore, the electronic device 310 may monitor whether the time to receive a new training signal arrives or not or whether new beam signaling is initiated.

When it is determined that the time to receive the training signal arrives, the electronic device 310 may perform an operation in step S812. When it is determined that the time to receive the training signal does not arrive, the electronic device 310 may continuously monitor whether the time to receive the training signal arrives.

When it is determined that the time to receive the training signal arrives, the electronic device 310 may discard the information for indicating the state of the electronic device 310 which is stored in the electronic device 310 in step S812. The electronic device 310 may discard the information to prevent unnecessary power consumption. In addition, the electronic device 310 may discard the information to guarantee a space (or an available space) left in a storage of the electronic device 310.

In some embodiments, although not illustrated in FIG. 8, the electronic device 310 may set a timer indicating a period for storing the information according to a beam signaling cycle between the electronic device 310 and another electronic device 320. In response to the set timer expiring, the electronic device 310 may discard the information for indicating the state of the electronic device 310, which is stored in a buffer or a storage in the electronic device 310.

As described above, when the electronic device 310 can determine a beam corresponding to the state of the electronic device 310 through beam signaling, the electronic device 310 may discard the information (or at least one value) for indicating the state of the electronic device 310. The electronic device 310 can guarantee an available space of the storage in the electronic device 310 by discarding the information for indicating the state of the electronic device 310. In addition, the electronic device 310 can reduce power consumption of the electronic device 310 by discarding the information for indicating the state of the electronic device 310.

Figure 9:
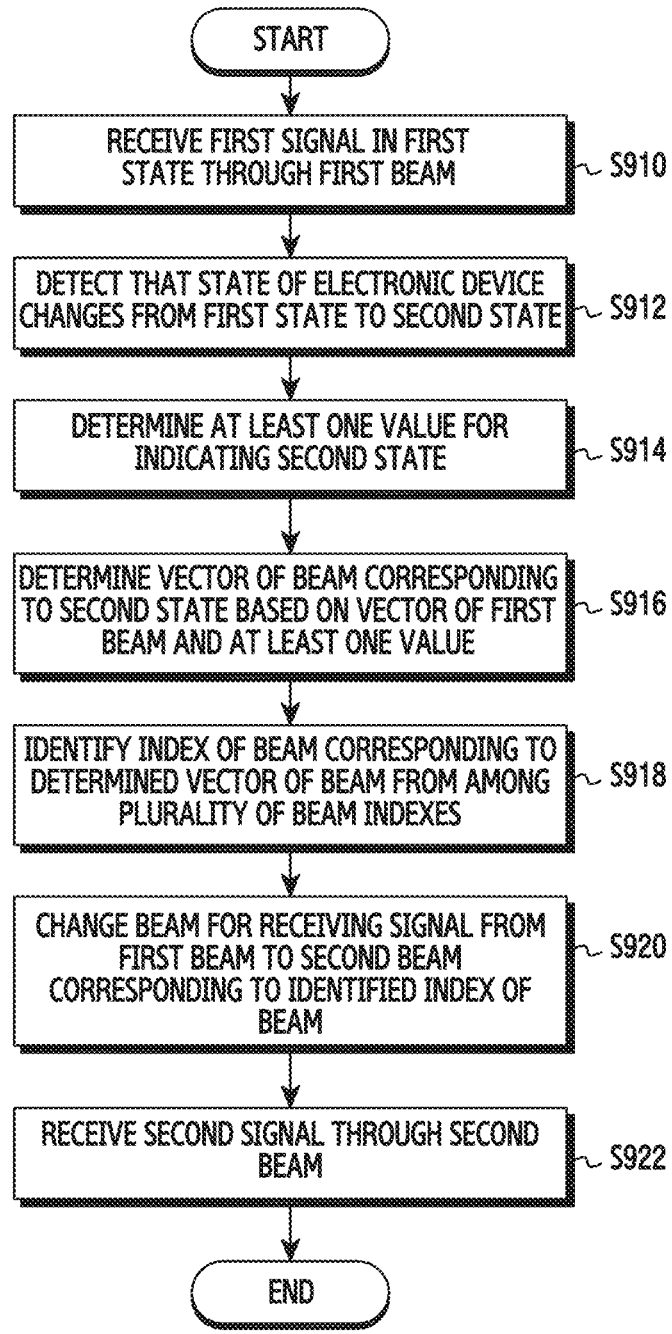
FIG. 9 illustrates an example of an operation flow of an electronic device which determines a beam corresponding to a state of the electronic device according to various embodiments of the present disclosure.

FIG. 9 illustrates an example of an operation flow of an electronic device which determines a beam corresponding to a state of the electronic device according to various embodiments of the present disclosure.

Referring to FIG. 9, in step S910, the electronic device 310 may receive a first signal transmitted from another electronic device 320 in a first state through a first beam. The first beam may be a beam that is determined through beam signaling between the electronic device 310 and another electronic device 320. The first beam may be a beam corresponding to the first state.

In step S912, the electronic device 310 may detect that the state of the electronic device 310 changes from the first state to a second state. For example, the electronic device 310 may detect that the state of the electronic device 310 changes from the first state to the second state using a sensor in the electronic device 310. The sensor may include one or more sensors for detecting the state of the electronic device 310. For example, the sensor may include one or more of a proximity sensor, a grip sensor, a geomagnetic sensor, an accelerometer, a gyro sensor, a G-sensor, a digital compass, or a global navigation satellite system (GNSS). The electronic device 310 may detect that the state of the electronic device 310 changes from the first state to the second state using the sensor in order to determine a beam corresponding to the state of the electronic device 310.

In step S914, the electronic device 310 may determine at least one value (or information) for indicating the second state. In some embodiments, the at least one value may be set by a relative value for indicating a relationship between the first state and the second state. For example, the at least one value may be set by a difference value between an angel of the electronic device 310 in the first state and an angle of the electronic device 310 in the second state, or a rotation variation. For example, when the electronic device 310 detects the state of the electronic device 310 using the gyro sensor, the at least one value may include a value indicating an X-axis rotation variation (for example, roll) between the first state and the second state, a value indicating an Y-axis rotation variation (for example, yaw) between the first state and the second state, and a value (or information) indicating a Z-axis rotation variation (for example, pitch) between the first state and the second state.

In some embodiments, the at least one value may be converted into a value which may be used in a cartesian coordinate system, a polar coordinate system, a spherical coordinate system, a cylindrical coordinate system, or the like. For example, the at least one value may be expressed by Equation 1 presented below:

$$R_x(\theta) = \begin{bmatrix} 1 & 0 & 0 \\ 0 & \cos\theta & -\sin\theta \\ 0 & \sin\theta & \cos\theta \end{bmatrix}$$

$$R_y(\varphi) = \begin{bmatrix} \cos\varphi & 0 & \sin\varphi \\ 0 & 1 & 0 \\ -\sin\varphi & 0 & \cos\varphi \end{bmatrix}$$

$$R_z(\delta) = \begin{bmatrix} \cos\delta & -\sin\delta & 0 \\ \sin\delta & \cos\delta & 0 \\ 0 & 0 & 1 \end{bmatrix}$$

Equation 1

In Equation 1, $R_x(\theta)$ is a matrix for indicating rotation conversion by $\theta$ in the counter clockwise direction on the x-axis of the cartesian coordinate system, $R_y(\varphi)$ is a matrix for indicating rotation conversion by $\varphi$ in the counter clockwise direction on the y-axis of the cartesian coordinate system, and $R_z(\delta)$ is a matrix for indicating rotation conversion by $\delta$ in the counter clockwise direction on the z-axis of the cartesian coordinate system. Trigonometrical function values forming each of the matrices included in Equation 1 may be determined by using a trigonometrical function table as shown in table 1, presented below, in order to reduce complexity:

TABLE 1

| | 0 | $\frac{\pi}{6}$ | $\frac{\pi}{4}$ | $\frac{\pi}{3}$ | $\frac{\pi}{2}$ |
|---|---|---|---|---|---|
| | 0° | 30° | 45° | 60° | 90° |
| sinθ | 0 | $\frac{1}{2}$ | $\frac{\sqrt{2}}{2}$ | $\frac{\sqrt{3}}{2}$ | 1 |
| cos θ | 1 | $\frac{\sqrt{3}}{2}$ | $\frac{\sqrt{2}}{2}$ | $\frac{1}{2}$ | 0 |
| tan θ | 0 | $\frac{1}{\sqrt{3}}$ | 1 | 3 | ∞ |

In some embodiments, the at least one value may be set by an absolute value indicating a relationship between a reference direction or a reference value and the second state. For example, the reference value may be the direction of gravity.

In step S916, the electronic device 310 may determine a vector of a beam corresponding to the second state based on a vector of the first beam and the determined at least one value. For example, the electronic device 310 may determine the vector of the beam corresponding to the second state using Equation 2 presented below:

$$\overrightarrow{Beam}_m = R^{-1} \times \overrightarrow{Beam}_k$$

Equation 2

In Equation 2, $R^{-1}$ is an inverse matrix of a matrix for indicating the at least one value in Equation 1, $\overrightarrow{Beam}_k$ is the vector of the first beam, and $\overrightarrow{Beam}_m$ is the vector of the beam corresponding to the second state.

In step S918, the electronic device 310 may identify (or determine) an index of a beam corresponding the determined vector of the beam from among a plurality of beam indexes for indicating beams. For example, the electronic device 310 may store a beam book as shown in table 2 presented below:

TABLE 2

| Antenna Index | Beam Index | Beam Degrees | | Beam vector |
|---|---|---|---|---|
| | | Azimuth | Elevation | |
| 1 | 0 | — | 0° | x, y, z |
| 1 | ... | | ... | ... |
| 1 | 15 | | 90° | ... |
| 2 | 16 | | 90° | ... |
| 2 | ... | | ... | ... |
| 2 | 30 | | 180° | ... |
| ... | ... | ... | ... | ... |

In table 2, the antenna index is a value for indicating one antenna from among a plurality of antennas included in the electronic device 310, the beam index is a value for indicating one beam from among a plurality of beams that can be generated by the electronic device 310, the beam degrees are values for indicating angles of beams, the azimuth is a value for indicating a horizontal angle of a beam, the elevation is a value for indicating a vertical angle of a beam, and the beam vector is a value for indicating a vector of a beam.

According to embodiments, a portion of the parameters (for example, antenna index, beam degrees) of table 2 may be omitted.

The electronic device 310 may identify an index of a beam corresponding to the determined vector of the beam from among the plurality of beam indexes for indicating beams based on table 2 and Equation 3 presented below:

$$\overrightarrow{Beam_l} = \operatorname{argmin}_n |\overrightarrow{Beam_m} - \overrightarrow{Beam_n}| \qquad \text{Equation 3}$$

In Equation 3, $\overrightarrow{Beam_m}$ is the vector of the beam corresponding to the second state, $\overrightarrow{Beam_n}$ is a beam vector included in the beam book as shown in table 2, and $\overrightarrow{Beam_l}$ is an index of a beam corresponding to the determined vector of the beam and included in table 2.

In step S920, the electronic device 310 may change the beam for receiving a signal from the first beam to a second beam corresponding to the identified index of the beam. The electronic device 310 may determine the beam for receiving the signal, which is determined through the operations in steps S914 to S918, as the second beam, in order to increase a transmission rate of the signal.

In step S922, the electronic device 310 may receive a second signal transmitted from another electronic device 320 through the second beam.

According to embodiments, the method illustrated in FIG. 9 may be implemented in other methods. For example, the electronic device 310 may provide information on the determined at least one value to a beamforming controller included in a radio frequency front end (RFFE) of the electronic device 310. In this case, the beamforming controller which receives the information on the at least one value may control to generate the second beam based on the at least one value. In another example, the electronic device 310 may provide the vector of the beam corresponding to the second state to the beamforming controller. In still another example, when the electronic device 310 is provided with a communication processor (CP) and an application processor (AP) independently, the electronic device 310 may process the operations in steps S914, S916, and S918 at the AP. The electronic device 310 may provide information on the identified index of the beam to the CP. The CP which receives the information on the identified index of the beam may perform the operation in step S920. In other words, the electronic device 310 may implement the method for changing a beam according to various embodiments of the present disclosure in various methods in order to reduce complexity of the electronic device 310.

As described above, the electronic device 310 may determine the beam corresponding to the state of the electronic device 310 without beam signaling with another electronic device 320. The electronic device 310 can enhance a reception rate of a signal transmitted from another electronic device 320 by adaptively changing the beam according to the state of the electronic device 310.

Figure 10:
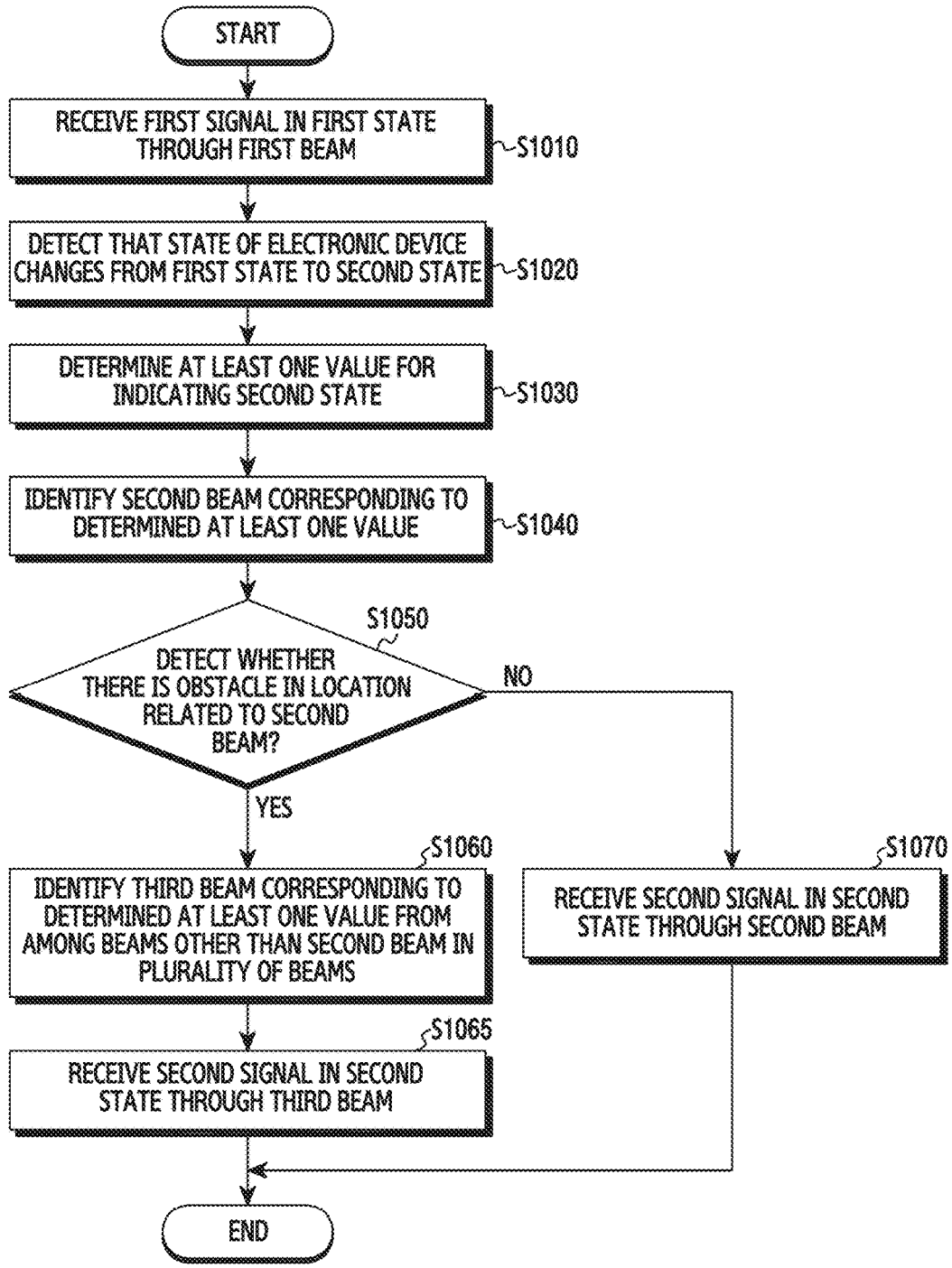
FIG. 10 illustrates another example of an operation flow of an electronic device which determines a beam corresponding to a state of the electronic device according to various embodiments of the present disclosure.

FIG. 10 illustrates another example of an operation flow of an electronic device which determines a beam corresponding to a state of the electronic device according to various embodiments of the present disclosure.

Referring to FIG. 10, in step S1010, the electronic device 310 may receive a first signal transmitted from another electronic device 320 in a first state through a first beam.

In step S1020, the electronic device 310 may detect that the state of the electronic device 310 changes from the first state to a second state using a sensor included in the electronic device 310.

In step S1030, the electronic device 310 may determine at least one value for indicating the second state. In step S1040, the electronic device 310 may identify (or determine) a second beam corresponding to the determined at least one value.

The determined second beam may correspond to a state of the electronic device 310 which is determined based on movement, rotation, and tilt of the electronic device 310. When there is an obstacle on a path corresponding the determined second beam, the determined second beam may correspond to the state of the electronic device 310, but may not be a best beam for receiving a signal. The electronic device 310 according to various embodiments of the present disclosure may perform an operation in step S1050 to remedy this situation.

In step S1050, the electronic device 310 may detect whether there is an obstacle (object) in a location (or direction, path, or the like) related to the second beam using a sensor included in the electronic device 310. For example, the electronic device 310 may detect whether there is an obstacle in the proximity of the electronic device 310 using a GNSS or a proximity sensor included in the electronic device 310. The obstacle may be an object that causes a path loss between the electronic device 310 and another electronic device 320 to be greater than or equal to a threshold. The obstacle may be an object that causes interference in the electronic device 310. The obstacle may be an object which disrupts forming of the second beam.

When it is detected that there is an obstacle in the location related to the second beam, the electronic device 310 may perform an operation in step S1060. When it is not detected that there is an obstacle in the location related to the second beam, the electronic device 310 may perform an operation in step S1070.

When it is detected that there is an obstacle in the location related to the second beam, the electronic device 310 may identify (or determine) a third beam corresponding to the at least one value from among beams other than the second beam in the plurality of beams of the electronic device 310 in step S1060. Since the electronic device 310 may select (determine) a beam of a location or a direction unrelated to the obstacle, the electronic device 310 may receive a signal transmitted from another electronic device 320 using a beam appropriate to an environment where the electronic device 310 is positioned.

In step S1065, the electronic device 310 may receive a second signal transmitted from another electronic device 320 in the second state through the third beam.

When it is not detected that there is an obstacle in the location related to the second beam, the electronic device 310 may receive the second signal transmitted from another electronic device 320 in the second state through the second beam in step S1070.

As described above, the electronic device 310 may select a best beam for receiving a signal by considering not only the state of the electronic device 310 but also the environment where the electronic device 310 is positioned. In other words, through the operations illustrated in FIG. 10, the electronic device 310 can guarantee a signal reception rate greater than or equal to a predetermined level regardless of the state of the electronic device 310 and the environment where the electronic device 310 is positioned.

Figure 11:
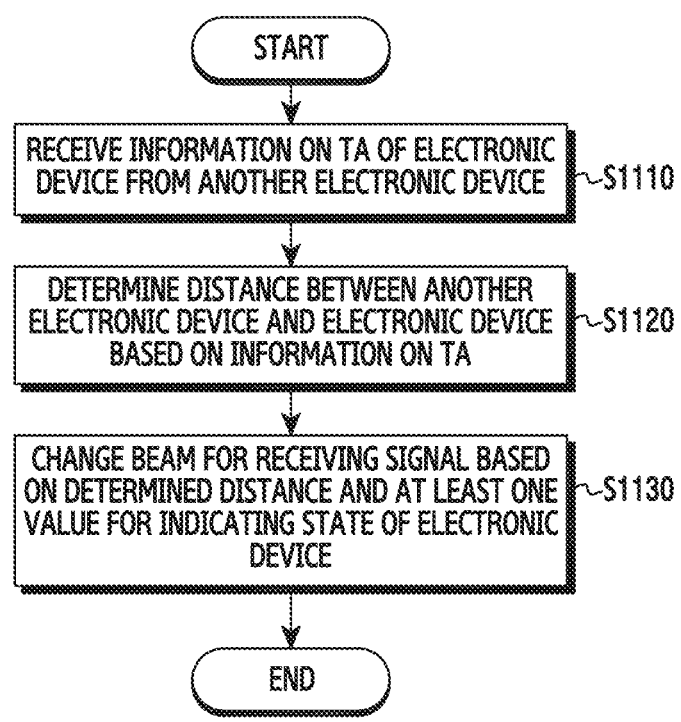
FIG. 11 illustrates still another example of an operation flow of an electronic device which determines a beam corresponding to a state of the electronic device according to various embodiments of the present disclosure.

FIG. 11 illustrates still another example of an operation flow of an electronic device which determines a beam corresponding to a state of the electronic device according to various embodiments of the present disclosure.

Referring to FIG. 11, in step S1110, the electronic device 310 may receive information on a timing advance (TA) of the electronic device 310 from another electronic device 320. The TA may be a medium access control (MAC) control element (CE) used for controlling a transmission timing of an uplink signal. The TA may be a value for indicating how fast (or how slow) the electronic device 310 transmits a signal to another electronic device 320.

In step S1120, the electronic device 310 may determine a distance between the electronic device 310 and another electronic device 320 based on the information on the TA. The electronic device 310 may determine a value corresponding to the TA as the distance between the electronic device 310 and another electronic device 320.

In some embodiments, although not shown in FIG. 11, the distance between the electronic device 310 and another electronic device 320 may be determined through various methods. For example, when the electronic device 310 recognizes a location (or coordinates) of another electronic device 320, the electronic device 310 may determine the distance between the electronic device 310 and another electronic device 320 based on the location of the electronic device which is determined using a GNSS included in the electronic device 310 and the location of another electronic device 320.

In step S1130, the electronic device 310 may change a beam for receiving a signal based on the determined distance and at least one value for indicating the state of the electronic device 310. In other words, the electronic device 310 may determine a best beam for receiving a signal by considering not only the state of the electronic device 310 but also the distance between another electronic device 320 and the electronic device 310. For example, when the user plays an online racing game using the electronic device 310 while riding a high-speed train, the electronic device 310 may be rapidly rotated and may also be rapidly moved in a horizontal direction. In this situation, the electronic device 310 may consider not only the state of the electronic device 310 but also the distance between the electronic device 310 and another electronic device 320 in order to determine a best beam for receiving a signal.

As described above, the electronic device 310 may determine a best beam for receiving a signal by considering not only the state of the electronic device 310 which changes faster than beam signaling, but also mobility of the electronic device 310.

Figure 12:
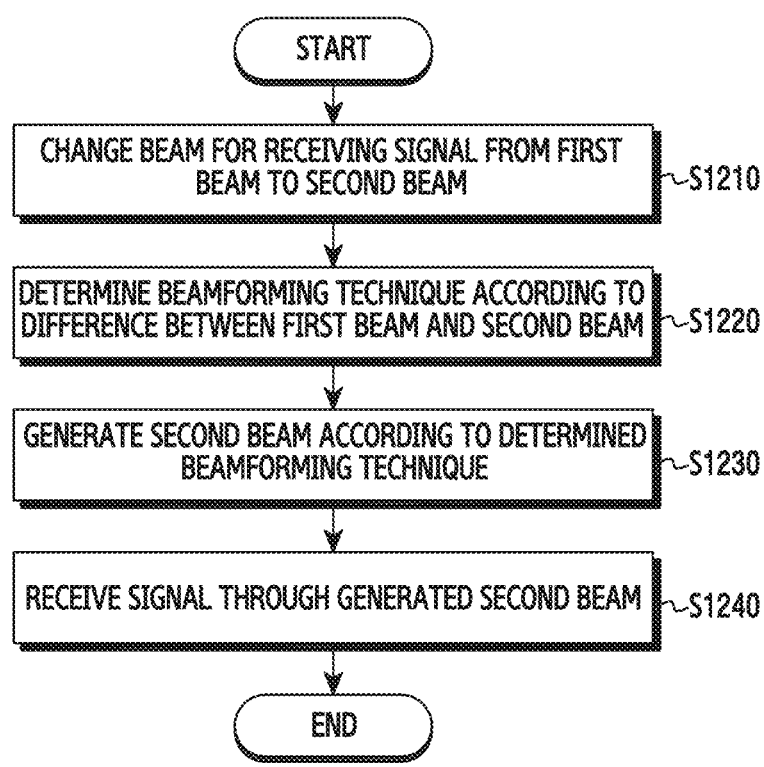
FIG. 12 illustrates an example of an operation flow of an electronic device which generates a changed beam according to various embodiments of the present disclosure.

FIG. 12 illustrates an example of an operation flow of an electronic device which generates a changed beam according to various embodiments of the present disclosure.

Referring to FIG. 12, in step S1210, the electronic device 310 may change a beam for receiving a signal from a first beam to a second beam. For example, the electronic device 310 may change the beam for receiving the signal from the first beam to the second beam using the operation flows illustrated in FIGS. 4, 9, 10, 11 and other drawings.

In step S1220, the electronic device 310 may determine a beamforming technique according to a difference between the first beam and the second beam. The beamforming technique may include an analog beamforming technique and a digital beamforming technique. The analog beamforming technique may be a technique that generates a beam physically having directionality using a plurality of RF paths and a phase shifter included in the electronic device 310. The digital beamforming technique may be a technique that generates a beam using a precoder. For example, when the difference between the first beam and the second beam is smaller than a threshold, the electronic device 310 may determine the beamforming technique for generating the second beam as the digital beamforming technique. In another example, when the difference between the first beam and the second beam is greater than or equal to the threshold, the electronic device 310 may determine the beamforming technique for generating the second beam as the analogue beamforming technique.

In some embodiments, the electronic device 310 may generate the second beam using a hybrid beamforming technique which is a combination of the analogue beamforming technique and the digital beamforming technique. In other words, the electronic device 310 may generate the second beam using various techniques for generating beams.

In step S1230, the electronic device 310 may generate the second beam according to the determined beamforming technique.

In step S1240, the electronic device 310 may receive a signal transmitted from another electronic device 320 through the generated second beam.

As described above, the electronic device 310 may adaptively select a technique for generating a beam according to how much the beam is changed. By adaptively selecting the technique for generating a beam, the electronic device 310 can reduce power consumed to generate the changed beam and can simplify the procedure for generating the changed beam.

Figure 13:
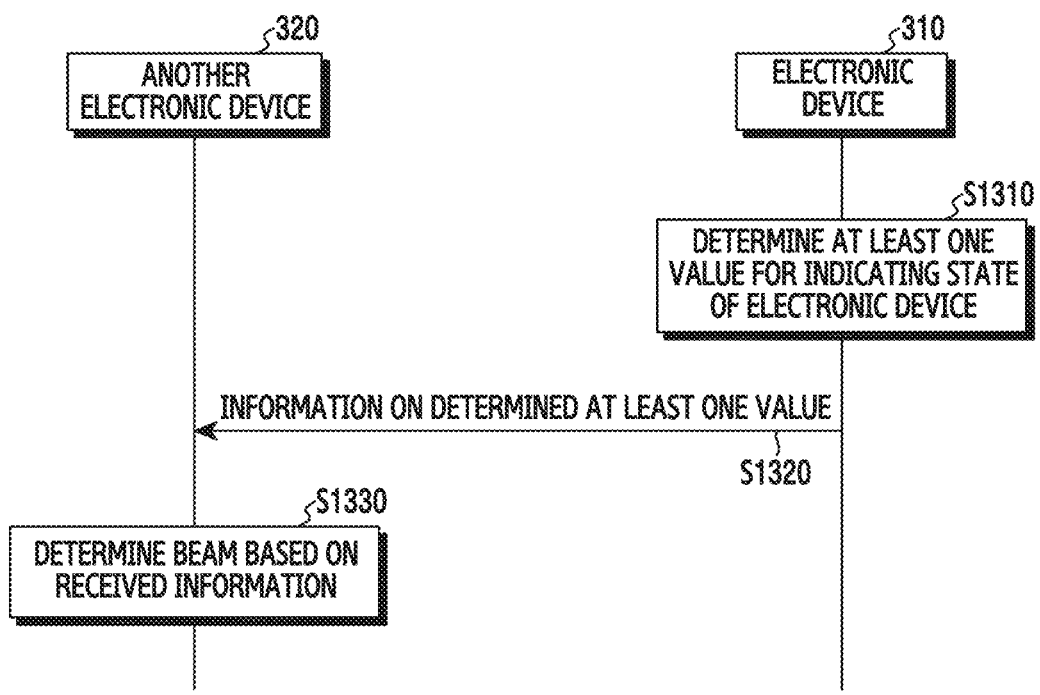
FIG. 13 illustrates an example of a signal flow between an electronic device which reports a value for indicating a state of the electronic device and another electronic device according to various embodiments of the present disclosure.

FIG. 13 illustrates an example of a signal flow between an electronic device which reports a value for indicating a state of the electronic device and another electronic device according to various embodiments of the present disclosure.

Referring to FIG. 13, in step S1310, the electronic device 310 may determine at least one value for indicating the state of the electronic device 310. For example, the electronic device 310 may determine at least one value for indicating the state of the electronic device 310 based on the state of the electronic device 310 which is detected by a sensor included in the electronic device 310.

In step S1320, the electronic device 310 may report (or transmit) information on the determined at least one value to another electronic device 320. The electronic device 310 may transmit the information on the determined at least one value in order for another electronic device 320 to transmit a signal to the electronic device 310 through a beam corresponding to the state of the electronic device 310 (that is, in order for another electronic device 320 to transmit a signal through a transmit beam of another electronic device 320 corresponding to the state of the electronic device 310). Another electronic device 320 may receive the information on the determined at least one value from the electronic device 310.

In step S1330, another electronic device 320 may determine a beam for transmitting a signal to the electronic device 310 from among a plurality of beams of another electronic device 320 based on the received information. Another electronic device 320 may determine a beam for transmitting a signal to the electronic device 310 by considering not only feedback received from the electronic device 310 in a previous beam signaling procedure but also the received information.

As described above, another electronic device 320 may determine a best beam for transmitting a signal to the electronic device 310 based on the state of the electronic device 310. Since the operations illustrated in FIG. 13 are performed regardless of beam signaling between the electronic device 310 and another electronic device 320, another electronic device 320 may determine a best beam for transmitting a signal to the electronic device 310 even when the state of the electronic device 310 is changed before next beam signaling is performed. In other words, another electronic device 320 may receive, from the electronic device 310, the information on the at least one value for indicating the state of the electronic device 310, such that it can guarantee a signal transmission rate greater than or equal to a predetermined level regardless of beam signaling with the electronic device 310.

According to various embodiments of the present disclosure described above, a method of an electronic device may include: receiving a first signal transmitted from another electronic device in a first state through a first beam; in response to the electronic device entering a designated mode, activating a sensor for detecting a change in a state of the electronic device; in response to it being detected that the state of the electronic device changes from the first state to a second state using the activated sensor, determining at least one value for indicating the second state; changing a beam for receiving a signal from the first beam to a second beam based on the determined at least one value; and receiving a second signal transmitted from the another electronic device through the second beam.

In some embodiments, the designated mode may include a mode for initiating decoding of control information received from the another electronic device in a DRX cycle. In addition, the method may further include decoding the control information, and, when the decoded control information does not include information on data, inactivating the activated sensor.

In some other embodiments, the designated mode may include a mode for initiating reception of a paging signal from the another electronic device. In addition, the method may further include inactivating the activated sensor when information for identifying the electronic device is not included in the received paging signal.

In some other embodiments, the designated mode may include a mode for initiating execution of an application that causes the state of the electronic device to be changed. In addition, the method may further include, in response to the application being terminated, inactivating the activated sensor.

In some other embodiments, the sensor may include a gyro sensor, and determining the at least one value may include, in response to it being detected that the state of the electronic device changes from the first state to the second state using the activated sensor, determining the at least one value indicating a rotation change of the electronic device between the first state and the second state.

In some other embodiments, changing the beam for receiving the signal may include: determining a vector of a beam corresponding to the second state using the determined at least one value and a vector of the first beam; identifying an index of a beam corresponding to the determined vector of the beam from among a plurality of beam indexes by comparing the determined vector of the beam and the plurality of beam indexes; and changing the beam for receiving the signal from the first beam to the second beam corresponding to the identified index of the beam.

In some other embodiments, the method may further include transmitting information on the at least one value to the another electronic device, and the transmitted information on the at least one value may be used to determine a beam of the another electronic device.

Figure 14:
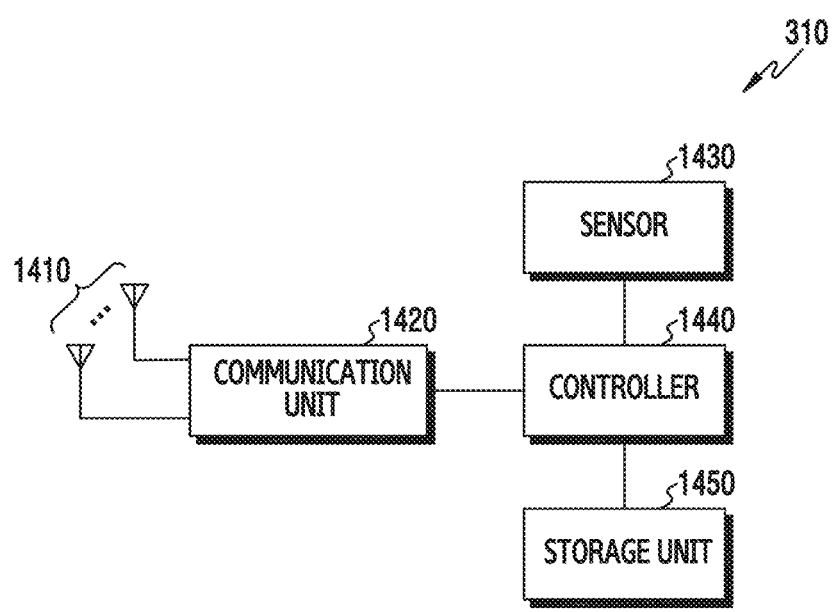
FIG. 14 illustrates an example of a functional configuration of an electronic device according to various embodiments of the present disclosure.

FIG. 14 illustrates an example of a functional configuration of an electronic device according to various embodiments of the present disclosure. This functional configuration may be included in the electronic device 310 illustrated in FIG. 3 and other drawings.

Referring to FIG. 14, the electronic device 310 may include at least one antenna 1410, a communication interface 1420, at least one sensor 1430, a controller (or a control unit) 1440, and a storage 1450.

The at least one antenna 1410 may include one or more antennas. The antenna 1410 may be configured to be appropriate to a multiple input multiple output (MIMO) technique.

The communication interface 1420 may perform functions for transmitting or receiving signals through a wire or wireless channel.

The communication interface 1420 may perform a conversion function between a baseband signal and a bit string according to a physical layer standard of a system. For example, in transmitting data, the communication interface 1420 may generate complex symbols by encoding and modulating a transmission bit string. In another example, in receiving data, the communication interface 1420 may restore a reception bit string by demodulating and decoding a baseband signal.

The communication interface 1420 may up-convert a baseband signal into an RF band signal and transmit the signal through the antenna 1410. The communication interface 1420 may down-convert an RF band signal received through the antenna 1410 into a baseband signal. For example, the communication interface 1420 may include a transmission filter, a reception filter, an amplifier, a mixer, an oscillator, a digital analog converter (DAC), an analog digital converter (ADC), or the like.

The communication interface 1420 may be operatively connected with the controller 1440.

The communication interface 1420 may include at least one transceiver. In addition, the communication interface 1420 may include a plurality of transmit paths each including an inverse fast Fourier transform (IFFT) unit, a series-parallel conversion unit, and a digital-analog conversion unit. In addition, the communication interface 1420 may include a plurality of receive paths each including an FFT unit, a parallel-series conversion unit, and an analogue-digital conversion unit. In some embodiments, the communication interface 1420 may further include a power amplifier (PA) for amplifying a transmit signal, a low noise amplifier (LNA) for amplifying a receive signal, and/or a phase shifter.

The at least one sensor 1430 may sense (or detect) the state of the electronic device 310. The at least one sensor 1430 may include a proximity sensor, a grip sensor, a geomagnetic sensor, an accelerometer, a gyro sensor, a G-sensor, a digital compass, a GNSS, or the like.

The at least one sensor 1430 may be operatively connected with the controller 1440.

The controller 1440 may control overall operations of the electronic device 310. For example, the controller 1440 may transmit or receive signals through the communication interface 1420. The controller 1440 may record data on the storage 1450 or read out data recorded on the storage 1450. To achieve this, the controller 1440 may include at least one processor. For example, the controller 1440 may include a CP for controlling communication and an AP for controlling an upper layer such as an application program.

The controller 1440 may be configured to implement the procedure and/or methods suggested in the present disclosure.

The storage 1450 may store a control command code for controlling the electronic device 310, control data, or user data. For example, the storage 1450 may include an application, an operating system (OS), middleware, a device driver.

The storage 1450 may include at least one of a volatile memory or a nonvolatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The nonvolatile memory may include a read only memory (ROM), a programmable ROM (PROM), an electrically programmable ROM (PROM), an electrically erasable ROM (EEPROM), a flash memory, or the like.

The storage 1450 may include a nonvolatile medium such as a hard disk drive (HDD), a solid state disk (SSD), an embedded multimedia card (eMMC), or a universal flash storage (UFS).

The storage 1450 may be operatively connected with the controller 1440.

According to various embodiments of the present disclosure as described above, an electronic device in a wireless environment may include: at least one processor; a sensor functionally connected with the at least one processor and configured to detect a change in a state of the electronic device; and a communication interface functionally connected with the at least one processor, and the at least one processor may be configured to: control to receive a first signal transmitted from another electronic device in a first state through a first beam; in response to the electronic device entering a designated mode, activate the sensor; in response to it being detected that the state of the electronic device changes from the first state to a second state using the activated sensor, determine at least one value for indicating the second state; change a beam for receiving a signal from the first beam to a second beam based on the determined at least one value; and control to receive a second signal transmitted from the another electronic device through the second beam.

In some embodiments, the designated mode may include a mode for initiating decoding of control information received from the another electronic device in a DRX cycle. In addition, the at least one processor may further be configured to: decode the control information; and, when the decoded control information does not include information on data, inactivate the activated sensor.

In some other embodiments, the designated mode may include a mode for initiating reception of a paging signal from the another electronic device. In addition, the at least one processor may further be configured to inactivate the activated sensor when information for identifying the electronic device is not included in the received paging signal.

In some other embodiments, the designated mode may include a mode for initiating execution of an application that causes the state of the electronic device to be changed. In addition, the at least one processor may further be configured to, in response to the application being terminated, inactivate the activated sensor.

In some other embodiments, the sensor may include a gyro sensor, and the at least one processor may be configured to, in response to it being detected that the state of the electronic device changes from the first state to the second state using the activated sensor, determine the at least one value indicating a rotation change of the electronic device between the first state and the second state.

In some other embodiments, the at least one processor may be configured to: determine a vector of a beam corresponding to the second state of the electronic device using the determined at least one value and a vector of the first beam; identify an index of a beam corresponding to the determined vector of the beam from among a plurality of beam indexes by comparing the determined vector of the beam and the plurality of beam indexes; and change the beam for receiving the signal from the first beam to the second beam corresponding to the identified index of the beam.

In some other embodiments, the at least one processor may further be configured to control to transmit information on the at least one value to the another electronic device, and the transmitted information on the at least one value may be used to determine a beam of the another electronic device.

In the present disclosure, specific operations explained as being performed by another electronic device 320 may be performed by another entity performing similar functions to those of another electronic device 320 according to embodiments. Various operations performed for communication with the electronic device 310 may be performed by network nodes other than another electronic device 320.

Methods based on the embodiments disclosed in the claims or specification can be implemented in hardware, software, or a combination of both.

When implemented in software, a computer readable recording medium for storing one or more programs (i.e., software modules) can be provided. The one or more programs stored in the computer readable recording medium are configured for execution performed by one or more processors in an electronic device. The one or more programs include instructions for allowing the electronic device to execute the methods based on the embodiments disclosed in the claims or specification.

The program (i.e., the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device can access via an external port to a device which performs the embodiments of the present disclosure. In addition, an additional storage device on a communication network may access to a device which performs the embodiments of the present disclosure.

In the above-described specific embodiments of the present disclosure, elements included in the present disclosure are expressed in singular or plural forms according to specific embodiments. However, singular or plural forms are appropriately selected according to suggested situations for convenience of explanation, and the present disclosure is not limited to a single element or plural elements. An element which is expressed in a plural form may be configured in a singular form or an element which is expressed in a singular form may be configured in plural number.

The various exemplary embodiments disclosed in the present specification and drawings are merely specific embodiments to easily explain the technical features and assist easy understanding, and are not intended to limit the scope of the present disclosure. Therefore, the scope of the present disclosure is defined not by the detailed description but by the appended claims, and all differences within the scope should be construed as being included in the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device in a wireless communication, the method comprising:
receiving, from another electronic device, a first signal in a first state through a first beam;
detecting a change of a state from the first state to a second state of the electronic device in a designated mode by activating a sensor;
determine at least one value for indicating the second state based on the change of the state, wherein the at least one value is a relative value for indicating a relationship between the first state and a second state;
determining a vector of a second beam which is used for the second state based on the at least one value and a vector of the first beam;
changing a beam for receiving a signal from the first beam to the second beam based on a beam index corresponding to the vector of the second beam, wherein the beam index is included in a plurality of beam indexes indicating a plurality of beams in which electronic devices are available; and
receiving, from the another electronic device, a second signal in the second state through the second beam.

2. The method of claim 1, wherein the designated mode comprises a mode for initiating decoding of control information received from the another electronic device in a discontinuous reception (DRX) cycle.

3. The method of claim 2, further comprising:
decoding the control information; and
if the decoded control information does not comprise information on data, inactivating the activated sensor.

4. The method of claim 1, wherein the designated mode comprises includes a mode for initiating reception of a paging signal from the another electronic device.

5. The method of claim 4, further comprising:
if information for identifying the electronic device is not included in the paging signal, inactivating the activated sensor.

6. The method of claim 1, wherein the designated mode comprises a mode for initiating execution of an application that causes the state of the electronic device to be changed.

7. The method of claim 6, further comprising, in response to the application being terminated, inactivating the activated sensor.

8. The method of claim 1, wherein the sensor comprises a gyro sensor, and
wherein determining the at least one value comprises, in response to a detection that the state of the electronic device changes from the first state to the second state using the activated sensor, determining the at least one value indicating a rotation change of the electronic device between the first state and the second state.

9. The method of claim 1, wherein changing the beam for receiving the signal comprises:
identifying the beam index corresponding to the vector of the second beam from among the plurality of beam indexes by comparing the second vector of the second beam and the plurality of beam indexes.

10. The method of claim 1, further comprising transmitting information on the at least one value to the another electronic device,
wherein the transmitted information on the at least one value is used to determine a beam of the another electronic device.

11. An electronic device in a wireless communication, the electronic device comprising:
at least one transceiver;
at least one sensor;
at least one processor operatively coupled to the at least one transceiver and the at least one sensor,
wherein the at least one processor is configured to:
control to receive, from another electronic device, a first signal in a first state through a first beam;
detect a change of a state from the first state to a second state of the electronic device in a designated mode by activating the at least one sensor;
determine at least one value for indicating the second state based on the change of the state, wherein the at least one value is a relative value for indicating a relationship between the first state and the second state;
determine a vector of a second beam which is used for the second state based on the at least one value and a vector of the first beam;
change a beam for receiving a signal from the first beam to the second beam based on a beam index corresponding to the vector of the second beam, wherein the beam index is included in a plurality of beam indexes indicating a plurality of beams in which electronic devices are available; and
control to receive, from the another electronic device, a second signal in the second state through the second beam.

12. The electronic device of claim 11, wherein the designated mode comprises a mode for initiating decoding of control information received from the another electronic device in a discontinuous reception (DRX) cycle.

13. The electronic device of claim 12, wherein the at least one processor is further configured to:
decode the control information; and
if the decoded control information does not comprise information on data,
inactivate the activated at least one sensor.

14. The electronic device of claim 11, wherein the designated mode comprises a mode for initiating reception of a paging signal from the another electronic device.

15. The electronic device of claim 14, wherein the at least one processor is further configured to:
if information for identifying the electronic device is not included in the paging signal,
inactivate the activated at least one sensor.

16. The electronic device of claim 11, wherein the designated mode comprises a mode for initiating execution of an application that causes the state of the electronic device to be changed.

17. The electronic device of claim 16, wherein the at least one processor is further configured to, in response to the application being terminated, inactivate the activated at least one sensor.

18. The electronic device of claim 11, wherein the at least one sensor comprises a gyro sensor, and
wherein the at least one processor is configured to, in response to it being detected that the state of the electronic device changes from the first state to the second state using the activated at least one sensor, determine the at least one value indicating a rotation change of the electronic device between the first state and the second state.

19. The electronic device of claim 11, wherein the at least one processor is configured to:
   identify the beam index corresponding to the vector of the second beam from among the plurality of beam indexes by comparing the vector of the second beam and the plurality of beam indexes.

20. The electronic device of claim 11, wherein the at least one processor is further configured to control to transmit information on the at least one value to the another electronic device,
   wherein the transmitted information on the at least one value is used to determine a beam of the another electronic device.

* * * * *